REMOTELY CONTROLLED RECORDER

Filed Aug. 30, 1965 10 Sheets-Sheet 1

INVENTORS
Thomas J. Schinner
Godfrey P. Goode
Carl K. Gieringer
BY
Wood, Herron & Evans
ATTORNEYS INVENTORS
Thomas J. Schinner
Godfrey P. Goode
Carl K. Gieringer
BY
Wood, Herron and Evans
ATTORNEYS INVENTORS
Thomas J. Schinner
Godfrey P. Goode
Carl K. Gieringer
BY
Wood, Herron & Evans
ATTORNEYS

REMOTELY CONTROLLED RECORDER

Filed Aug. 30, 1965

INVENTORS
Thomas J. Schinner
Godfrey P. Goode
Carl K. Gieringer
BY
Wood, Herron and Evans
ATTORNEYS INVENTORS
Thomas J. Schinner
Godfrey P. Goode
Carl K. Gielinger
BY
Wood, Herron and Evans
ATTORNEYS INVENTORS
Thomas J. Schinner
Godfrey P. Goode
Carl K. Gieringer
BY
Wood, Herron and Evans
ATTORNEYS INVENTORS
Thomas J. Schinner
Godfrey P. Goode
Carl K. Gieringer
BY
Wood, Herron & Evans
ATTORNEYS INVENTORS
Thomas J. Schinner
Godfrey P. Goode
Carl K. Gieringer
BY
Wood, Herron and Evans
ATTORNEYS Feb. 27, 1968 T. J. SCHINNER ET AL 3,371,349

REMOTELY CONTROLLED RECORDER

Filed Aug. 30, 1965 10 Sheets-Sheet 9

INVENTORS
Thomas J. Schinner
Godfrey P. Goode
Carl K. Gieringer
BY
Wood, Herron and Evans
ATTORNEYS Feb. 27, 1968 T. J. SCHINNER ET AL 3,371,349

REMOTELY CONTROLLED RECORDER

Filed Aug. 30, 1965 10 Sheets-Sheet 10

INVENTORS
Thomas J. Schinner
Godfrey P. Goode
Carl K. Gieringer
BY
Wood, Herron and Evans
ATTORNEYS 3,371,349
Patented Feb. 27, 1968

3,371,349

REMOTELY CONTROLLED RECORDER

Thomas J. Schinner, Cincinnati, Ohio, Godfrey P. Goode, Park Hills, Ky., and Carl K. Gieringer, Cincinnati, Ohio, assignors to The Cincinnati Time Recorder Company, Cincinnati, Ohio, a corporation of Ohio Filed Aug. 30, 1965, Ser. No. 483,730
13 Claims. (Cl. 346—60)

This invention relates to remotely controlled recording devices and, more specifically, to remotely controlled recording devices for providing a printed record of an event together with a printed record of the time of occurrence of the recorded event.

There is a growing need in industry to supervise, monitor, and evaluate scattered activities, instrumentalities and events. To efficiently perform these diverse control functions, it is desirable, among other things, to provide at one convenient central location records of events, activities, etc. occurring at the various scattered locations. At this central location a single individual, by scanning the record, can monitor all the events providing a savings in time and manpower.

Of course, to reap the greatest possible benefit from such a remote recording system the records themselves preferably have several attributes. They should, for example, be permanent. This gives the user perspective; it permits comparison of events over different periods to determine trends, cycles, progress, etc. The records should also be generated the instant the event occurs. Contemporaneously generated records inform one of events as they happen permitting appropriate action to be taken without delay. In addition, the records should be in intelligible form to permit their immediate use. Thus, a visual printout is highly desirable. Finally, to provide a maximum amount of information, the records should bear the time and date of the event. Records which have these desiderata provide the information necessary to properly assist industry in its task of supervising, monitoring and evaluating spatially and temporally scattered events.

In the past various suggestions have been made regarding the production of records of the type indicated. However, for one reason or another, none has proven satisfactory. For example, many of the prior proposals have lacked versatility. To satisfy the changing needs of many users a remotely controlled recorder should be versatile, i.e., it should be possible to change the mode of printout to or from alphabetic, numeric or alphanumeric codes, or to or from some other set of symbols, words, etc., as desired. Furthermore, the change must be capable of being made easily and quickly.

Other of the prior art proposals have lacked reliability. A recorder should be reliable even under conditions of hard usage. In many of the applications where they are used, errors cannot be tolerated. Thus, it is very advantageous for the recorder to have some provision for error checking and correcting. In addition, as to those errors which cannot be corrected without resorting to unjustifiably expensive and complex equipment, the recorder should at least be sophisticated enough to indicate on the record that such an error has occurred as well as the time of the occurrence. This, then, puts the user on notice that an event went unrecorded and gives him the time of the unrecorded event, which is itself often useful.

The most serious fault of the prior art proposals is that they lack simplicity in operation and construction. Hence, they cannot be produced at prices which make their use economically attractive.

It has been therefore an objective of this invention to provide a remotely controlled recorder which, because of its versatility, reliability and simplicity, is useful in performing record-making functions not practicable with prior art recorders.

It has been another principal objective of this invention to provide a remotely controlled recorder which, in addition to producing a printed record of an event, produces an adjacent printed record of the time of the event if such is desired.

In one preferred embodiment, the record is in the form of a continuous strip upon which the events are serially recorded. Each event is identified by printing a row of identifying characters such as numerals or letters over a portion of the strip. Next to this event-identifying legend is printed a notation of the time and date during which the event occurred.

It has also been considered an objective of this invention to provide a remotely controlled recorder which permits the printout mode to be easily and quickly changed.

It has been an objective of this invention to provide a remotely controlled recorder which has an automatic error detection and correction mechanism integral therewith for minimizing recording errors.

It has been a further objective of this invention to provide a remotely controlled recorder which produces a printed indication on the record when an event has not been recorded due to a temporary, uncorrectable fault in the operation of the recorder.

It has been a further objective of this invention to provide a remotely controlled recorder including a roll printing mechanism which reduces the impact and vibration often associated with printing operations.

One example of a specific use of such a recorder is in spotting potential fire hazards or analyzing the load in electrical distribution systems. In such an application, the activity of all circuit breakers over some arbitrary period is recorded. The circuit breaker activity is recorded in the form of a series of printouts on a record sheet. Each printout occupies a single line of the record sheet and includes a number designating the particular circuit breaker that is actuated and the time and date of the actuation. With this record, locations of recurring electrical overloads are then easily detected and proper remedial action taken.

Recorders of this invention are also useful in production equipment efficiency studies. With a single remotely controlled recorder, the starting and stopping times of all production equipment in a plant could be permanently recorded in printed form. In this application, the record also takes the form of a series of printouts on a record sheet. Specifically, each event appears on a single line of the record sheet and includes a designation of the machine, an indication of whether the machine started or stopped and the time it started or stopped. This record of production machine activity is then reviewed by efficiency experts with a view toward increasing the work assignments of the machines showing the least activity.

Another area in which the recorders of this invention find application is in security systems of various kinds. For example, in many cases it would be desirable to have a printed record of such events as door closure, turnstile operation, or safe, vault or file opening. A watchman or security officer monitoring the recorder at some convenient centrally located point would be immediately made aware that a possible security infraction was being perpetrated and could be dispatched to the scene to investigate. If immediate attention to the security breach is not required due to the nature of the secured subject matter, a watchman would not be needed to monitor the recorder. Instead, the printed record of events could periodically be reviewed and appropriate action taken as dictated by the particular circumstances of the case. In either case, the record would be in the form of a series of printouts on a record sheet each of which appears on a single line and includes a designation of the vault, safe, door or turnstile operated as well as the time and date of actuation. This and the preceding examples are but a few of the almost unlimited number of applications where remotely controlled printers can be used.

In a preferred form of this invention, these objectives are accomplished by providing a recorder which includes a frame having attached to the back of it a group of vertically disposed receivers for receiving a group of character signals transmitted from a remote transmitting station. Detachably mounted opposite each receiver is a printer module. The printer modules, which collectively form a modular printer assembly, are physically interchangeable, independently operable devices. They each contain a rotatably mounted print wheel having a series of characters about its periphery which is adapted to be sequentially driven past a print station. The modules also contain a circular array of character signal terminals corresponding in number to the number of characters on the print wheel and a rotatably mounted scanner for scanning the array of terminals in synchronism with the movement of the characters past the print station. Each terminal of the array is electrically interconnected with a channel of its associated receiver. Thus, for every printer module there is a receiver having as many channels as there are characters on a print wheel.

Also provided in the preferred embodiment and associated with each module is a group of independently operable brake means for arresting the motion of the print wheels when their associated scanners have detected a character signal at one of the terminals of their associated array.

The preferred embodiment further includes a group of platens associated with the print wheels. The platens are mounted at the print station opposite their respective print wheels. Each platen includes a platen wheel, a rotatably mounted drive member, a support element rotatably supporting the platen wheel at one end thereof and eccentrically connected to the drive member at the other end thereof, and a biasing means connected between the support element and the drive means for biasing the platen wheel against its associated print head when the drive member is rotated to effect printing.

To print in response to the transmission of a group of character signals to the group of receivers, drive means are energized for synchronously rotating the scanners and the print wheels. As each scanner of a module detects a character signal at one of the terminals in its associated array, a brake is actuated stopping the print wheel of that module thereby positioning at the print station the character corresponding to the signal transmitted to that particular module. Having positioned the characters, the group of platen wheels which is located at the print station opposite the print wheels is actuated to urge a record sheet interposed therebetween into printing relationship with the characters. Thus, each platen wheel cooperates with the print wheel with which it is aligned to produce a printout of the transmitted event on a single line of the record sheet.

Also included in the preferred embodiment, but operable independently of the modular printing assembly previously described, is a self-contained time and data printing unit. This unit, which is operated by a suitable motor-powered clock mechanism, is detachably mounted to the frame in juxtaposition to the modular printing assembly. The time and date print wheels in the unit are located so as to permit the characters, which reflect the appropriate time and date at any instant, to properly register at the print station. To effect printing, additional platens of the type previously described are provided. These platens are aligned with the time and date print wheels and when actuated print the time and date on the record sheet on a single line alongside the printout of the transmitted event.

An error checking and correcting mechanism is additionally included in the preferred embodiment. The mechanism includes a motor-actuated cam, the rotation of which is automatically initiated each time a printout is desired. This cam in conjunction with suitable switches initiates a second scanning cycle should a printout not occur after the first scan. Should a printout fail to occur after the second scan, the cam of the error checking and correcting mechanism, by further rotation, actuates additional switches which transmit signals to fault symbol terminals in the arrays and produce a third scan to effect a printout of these fault symbols. Should the test character printout fail to occur indicating an event has gone unrecorded, the cam, by further rotation, actuates a cut-off switch to completely de-energize the machine. Thus, the test mechanism carries out a three-step error checking and correcting program.

These and other objects of our invention will be apparent from a further consideration of the following detailed description of the drawings in which a typical embodiment of the invention is disclosed. In the drawings.

GENERAL DESCRIPTION

Figure 1:
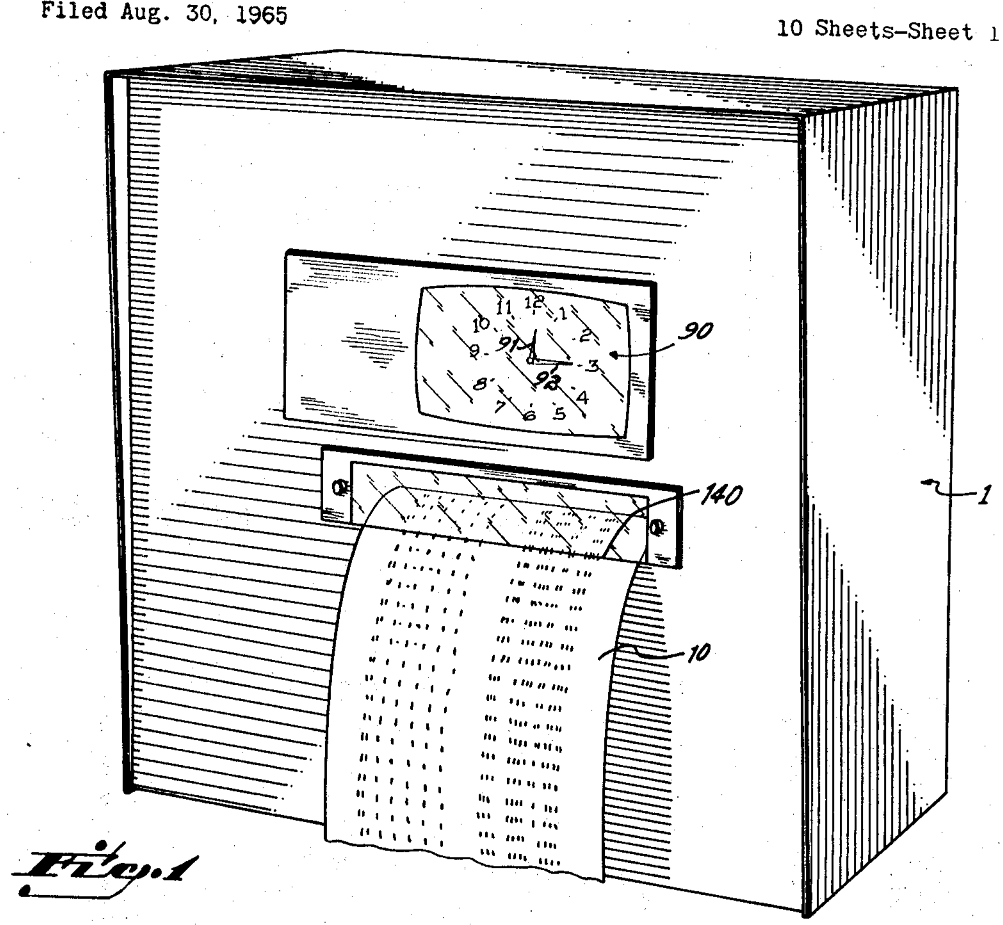
FIGURE 1 is a perspective view of a remotely controlled recorder constructed in accordance with the present invention.
Figure 2:
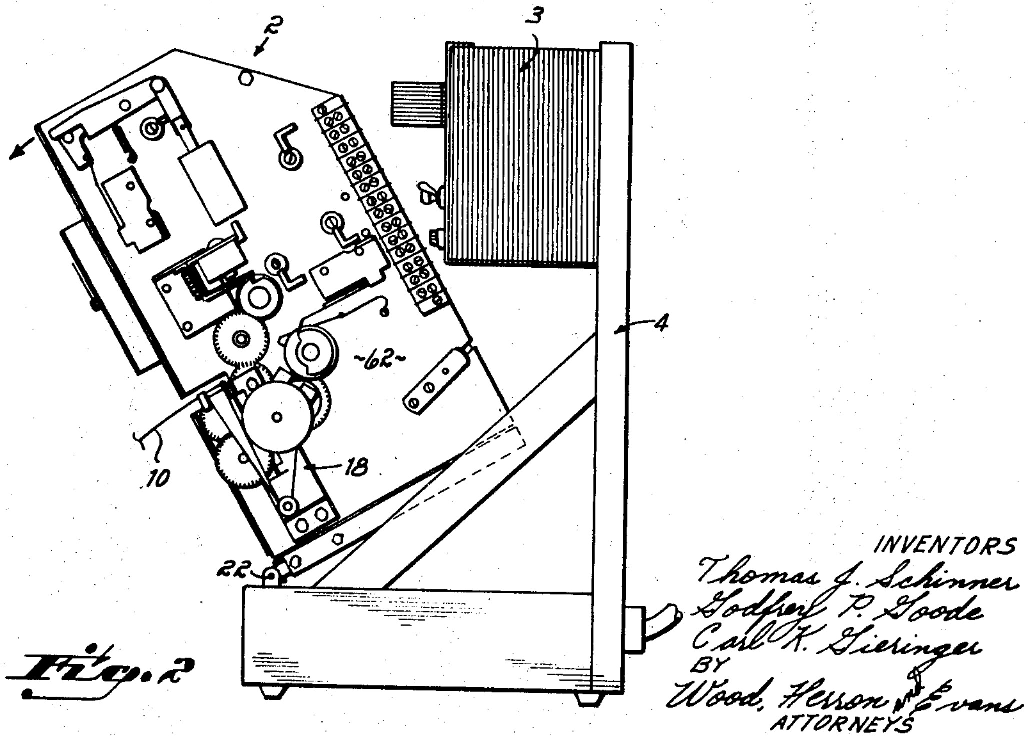
FIGURE 2 is a side elevational view of the recorder with the cover removed showing the recorder pivoted forwardly on trunnion mounts.
Figure 5:
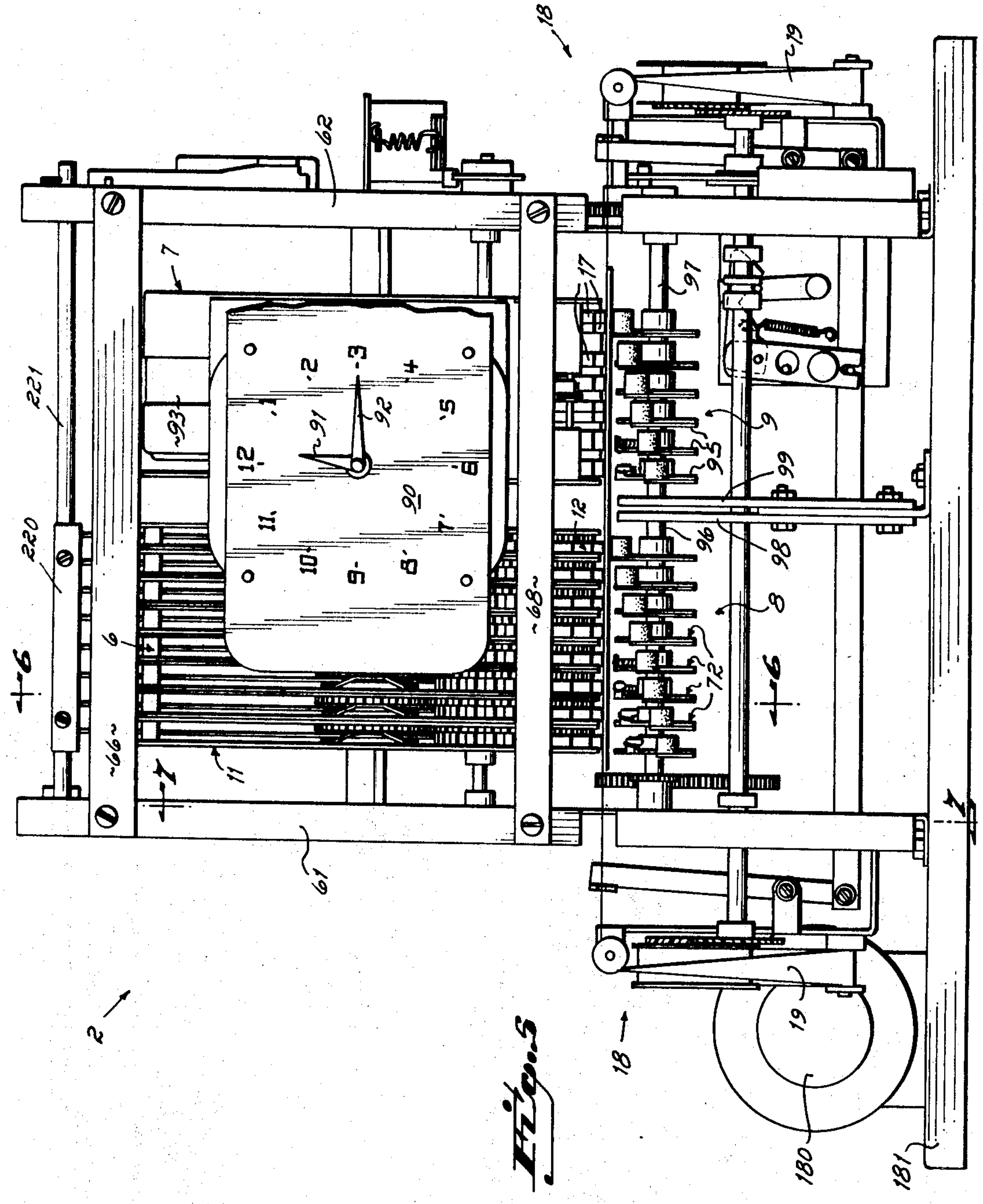
FIGURE 5 is a front elevational view of the recorder taken along the line 5—5 of FIGURE 4.

As shown in FIGURES 1 and 2, the recorder generally includes a housing 1, a printer 2 and power package 3 normally enclosed within the housing 1, and a frame 4 supporting the printer 2 and power package 3. The printer 2, which is best shown in FIGURE 5, includes a modular printer assembly 6, a time and date printer unit 7, and two independently operable platen assemblies indicated generally by the numerals 8 and 9. Platen assemblies 8 and 9 cooperate, respectively, with the modular printer assembly 6 and the time and date printer unit 7 to produce a printout of the recorded event on a sheet of paper 10 fed therebetween. The printout is produced at a print station, i.e., at a point between the printers 6 and 7 the platen assemblies 8 and 9.

Figure 6:
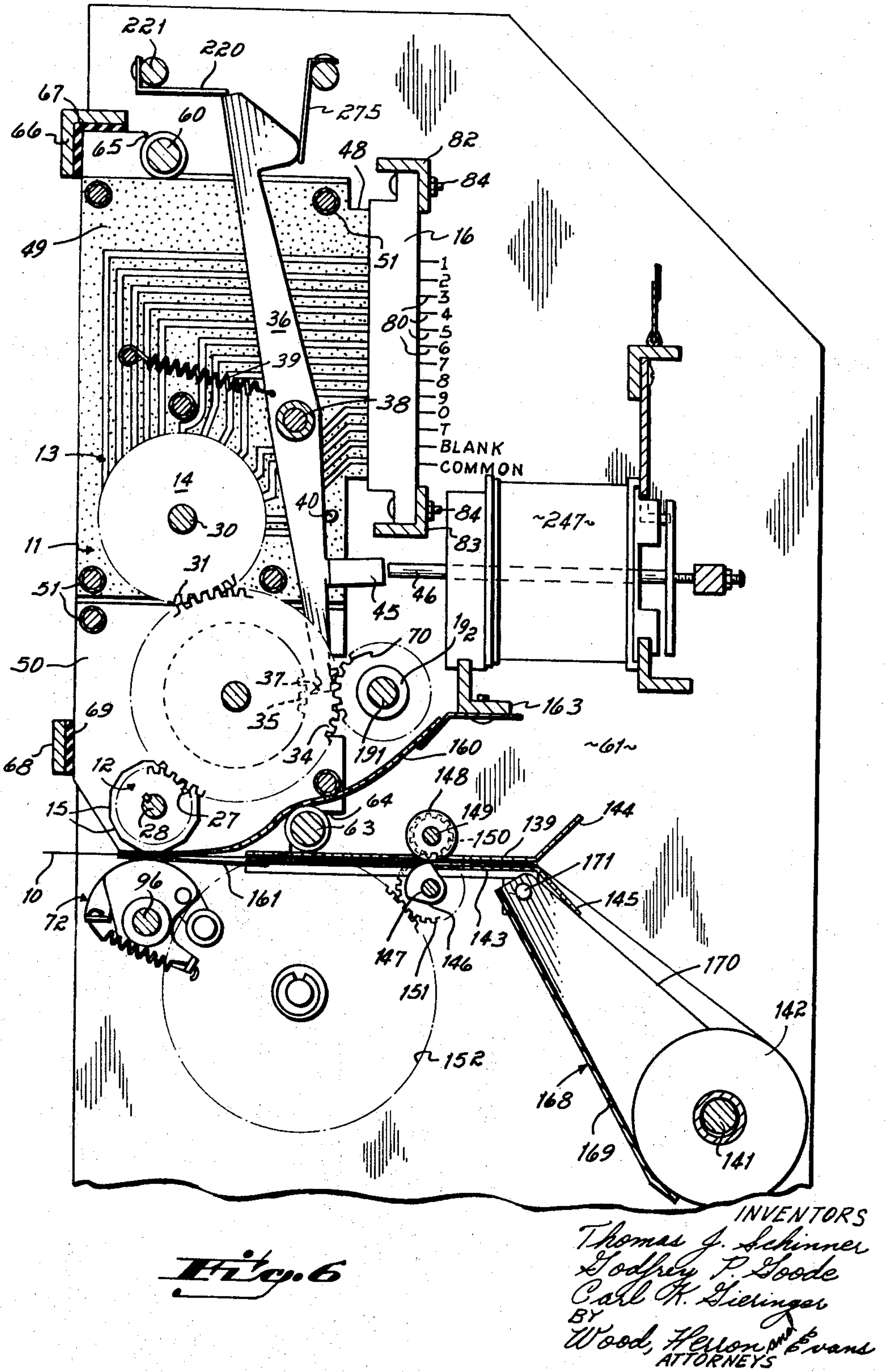
FIGURE 6 is a cross sectional view taken along line 6—6 of FIGURE 5.

The modular printer assembly 6 includes a plurality of physically interchangeable printer modules 11, which are mounted vertically within the printer 2. Each module 11 contains, as shown in FIGURE 6, a print wheel 12, a circular array of character terminals 13, and a rotatably mounted terminal scanner 14. The different terminals 13 of the module array correspond to different characters 15 on the module print wheel 12 and are electrically connected to different channels of a receiver 16 associated with this particular module. Thus, there are as many channels in a receiver 16 and as many terminals 13 in an array as there are characters 15 on a print wheel 12; and as many receivers 16 as there are printer modules 11.

The time and date printer unit 7, shown in FIGURE 5, includes time and date print wheels 17 located at the print station immediately above the paper record sheet 10. The print wheels 17 are coupled to a motor 93 in a manner well known by those skilled in the art to cause rotation of the print wheels 17 at the proper rates so that at all times characters representing the time and date will be properly registered at the print station. Also shown in FIGURE 5 is a conventional ribbon feed mechanism generally indicated by the numeral 18. This mechanism feeds a ribbon 19 between the paper 10 and the print wheels 12 and 17. It is to be understood that neither the ribbon feed mechanism 18 nor the time and date printer unit 7 form a part of this invention.

In operation, a group of character signals transmitted from a remote station are received by the group of receivers 16 (FIGURE 6), each receiver 16 receiving one of the character signals. Depending on the characters received, one channel of each receiver is energized transmitting the character signals to the appropriate terminal of each array. When suitable motor means are energized, the scanners 14 and print wheels 12 of each module 11 rotate in synchronism. As each scanner senses an energized terminal of its associated array 13, the motion of its associated print wheel 12 is arrested, positioning it at the print station the character 15 that corresponds to the character signal transmitted to that printer module. When all the character signals have been sensed and all the print wheels 12 stopped, the platen assembly 8 is actuated producing a printout of the event on the paper record sheet 10. At the same instant, if desired, the time and date printout can be produced by platen assembly 9, the time and date print wheels 17 already having been properly registered at the print station by the clock mechanism of the time and date printer unit 7.

To facilitate maintenance of the printer 2, trunnion mounts 22 are provided, as clearly shown in FIGURE 2. This permits the printer 2 to be pivoted forwardly giving easy access to the back of the printer 2.

DETAILED DESCRIPTION

*Modular printer assembly.*—As shown in FIGURE 5, the modular printer assembly, indicated generally by the numeral 6, comprises eight printer modules 11. Each printer module 11 is an independently operable, physically interchangeable mechanism.

Figure 12:
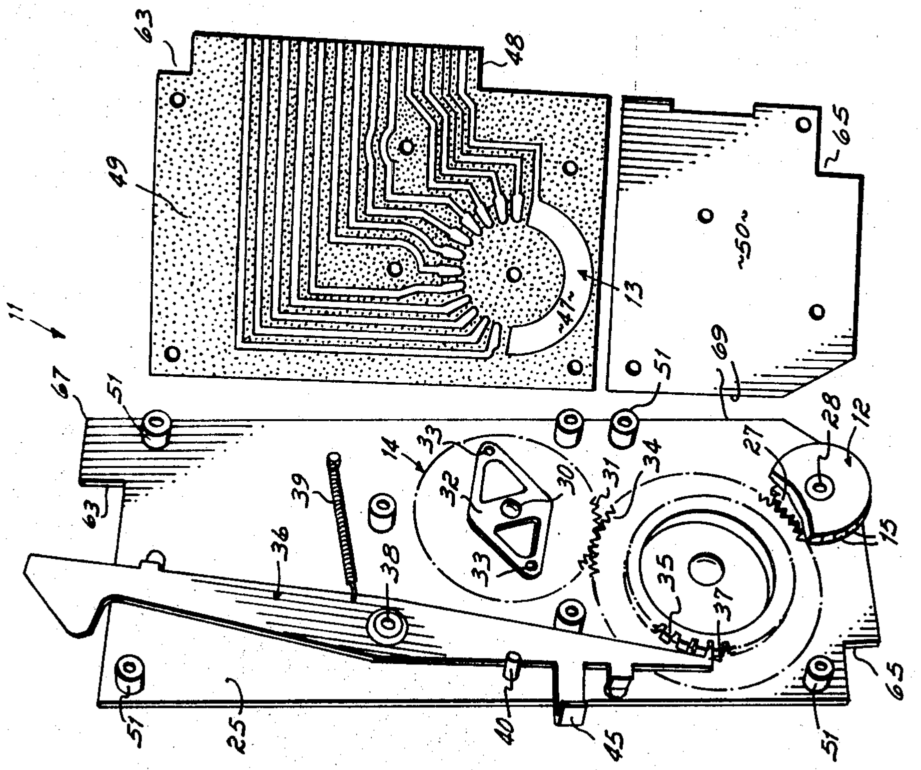
FIGURE 12 is a perspective view of a partly disassembled printer module showing the inside thereof.

A typical module, referring to FIGURE 12, includes a subframe 25 upon which is rotatably mounted a print wheel 12 having twelve character positions 15 formed in its peripheral surface at equally spaced intervals. Eleven of these positions bear the numeric characters 1, 2, 3, 4, 5, 6, 7, 8, 9, 0 and the fault symbol T, the twelfth position in this case being blank. Of course, the characters themselves as well as the number thereof can vary depending on the particular application. Integral with the print wheel 12 is a print gear 27 also mounted for rotation. Both the print wheel 12 and the print gear 27 are journalled on the shaft 28, which is anchored to the subframe 25.

Also rotatably mounted on the subframe 25 is the scanner 14. The scanner 14, which is journalled on a shaft 30 anchored to the subframe 25, includes a gear 31 and an electrically conducting contact arm 32. The contact arm 32, which preferably is manufactured of Phosphor bronze and has two silver contacts 33 at the extremities thereof, is mounted to the gear 31 for motion therewith. The contact arm 32 must be electrically insulated from the rest of the printer module and this is preferably accomplished by manufacturing the gear 31 of insulating material.

Meshing with each of the gears 27 and 31 and forming part of the printer module 11, is a synchronizing gear 34. The synchronizing gear 34 meshes with a drive gear 70 as shown clearly in FIGURE 6. Returning to FIGURE 12, it is seen that synchronizing gear 34 is provided with a notched annular hub 35 formed integral therewith.

A lever 36 having a pawl 37 at one end is journalled about shaft 38 which in turn is anchored to the subframe 25. The pawl 37 of the lever 36 is normally held out of engagement with the notched hub 35 by a spring 39 which is connected between the subframe 25 and the lever 36 at a point above the shaft 38. A pin 40 which is anchored to the subframe 25 abuts the edge of the lever 36 limiting the motion of the pawl 37 under the biasing action of the spring 39. Integral with the lever 36 is an abutment 45 adapted to be engaged by the end of the solenoid core 46 (see FIGURE 6) when it is desired to move the pawl 37 into one of the notches of the hub 35 to stop the motion of the print wheel 12.

Also forming part of the print module 11 is an array of twelve terminals 13 arranged in a semicircle. The twelve terminals 13 correspond to the twelve character positions 15 on the print wheel 12. The twelve terminals 13 as well as a common terminal 47 are all brought to a common edge 48 of the nonconducting terminal support 49. Preferably the terminals 13 and 47 are applied to the terminal support 49 by conventional printed circuit techniques.

Completing the print module 11 is a plate 50 which in combination with the terminal support 49 forms one side of the print module 11, the other side being the subframe 25. Spacers 51 provide the necessary clearance for movement of the print wheel 12, gears 27, 31 and 34, and the lever 36 when the print module 11 is assembled. Assembly is accomplished by fastening the subframe 25 parallel to the terminal support 49 and plate 50 with the moving parts of the print module sandwiched therebetween, but free to move due to the presence of the spacers 51. With the printer module 11 assembled, the contacts 33 of the scanner 14 are in electrical contact with the terminals 13 and 47 of the array.

Figure 11:
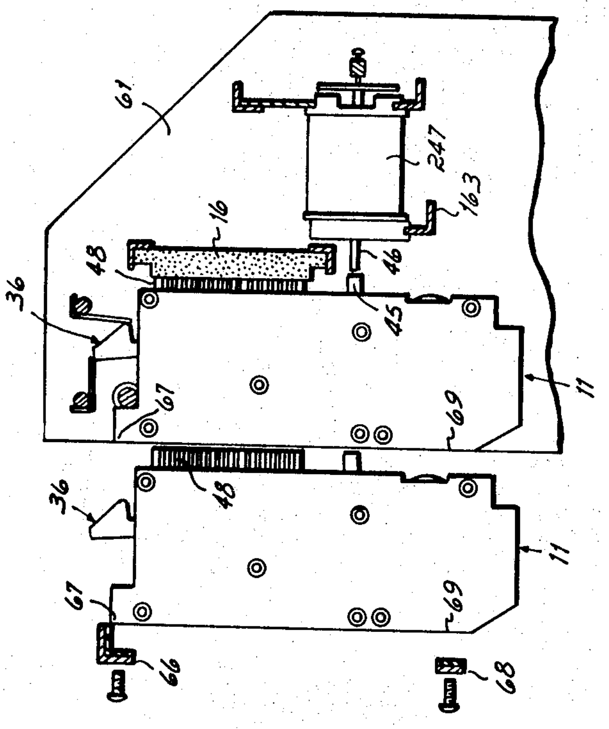
FIGURE 11 is a side elevational view of a printer module before and after detachably mounting it into the modular printer assembly.

The individual assembled printer modules 11 comprising the modular printer assembly 6 are mounted vertically in the printer 2 as clearly shown in FIGURES 5, 6, and 11. The edge 48 of the terminal support 49, which extends beyond the subframe 25, is inserted into a pluggable receptacle or receiver 16 to be described in more detail later. To insure that the printer modules 11 are properly inserted and aligned, horizontal bars 60 and 64 spanning the frame sides 61 and 62 are provided. Circumferential grooves in the bars 60 and 64 engage the edges 63 and 65, respectively, of the subframe 25 providing proper spacing between the printer modules 11. Horizontal bars 66 and 68, which engage the corners 67 and the edges 69 of the subframes 25, lock the printer modules 11 in proper registration with the grooves of the bars 60 and 64.

When the modules 11 are assembled in the modular printer assembly 6, the print wheels 12 are all co-axially aligned, in proper registration with the print station, and positioned above the individual platens 72 of the platen assembly 8 as is shown in FIGURE 6. In addition, synchronizing gear 34 meshes with drive gears 70, and the lever 36 has its abutment 45 opposite the solenoid core 46 as shown in FIGURES 6 and 11.

*Receiver.*—The receiver 16, as shown in FIGURES 6 and 11, is a pluggable connector adapted to accept the insertion therein of the edge 48 of the terminal support 49. The receiver which can be of any of the well known commercially available varieties, has as many individual female electrical connectors therein as there are terminals 13 in the array. In the case of a twelve point print wheel there would necessarily be twelve connectors constituting the twelve channels of the receiver plus a thirteenth connector to accommodate the common terminal 47. Each of the female connectors is electrically connected to a post 80. The posts are connectable to the remotely located character signal generators, which are to be described later, by any of the well known methods of signal transmission. There is one post 80 for each character position 15 on the print wheel 12 and for the common terminal 47 as indicated in FIGURE 6.

The receivers 16 are mounted in juxtaposed relationship on two horizontal bars 82 and 83. The bars 82 and 83 are connected at their ends to the frame sides 61 and 62. Fasteners 84 secure the receivers 16, at their upper and lower extremities to the mounting bars 82 and 83.

In operation, if an eight digit number or event were being transmitted to the recorder, eight individual character signals are transmitted to the bank of eight receivers 16, one signal to each receiver. The particular post 80 in each receiver 16 to which a character signal is transmitted depends on the particular eight digit number transmitted. For example, if the number were 25793864, the following posts would be in receipt of signals.

| Receiver | 1 | 2 | 3 | 4 | 5 | 6 | 7 | 8 |
|---|---|---|---|---|---|---|---|---|
| Post | 2 | 5 | 7 | 9 | 3 | 8 | 6 | 4 |

The character signals present at the above designated posts 80 of the eight different receivers 16 are transmitted by the female connectors in the respective receivers 16 to the character terminals 13 of the arrays to which they are connected, one signal being transmitted to each array. At each array, the character signals is sensed by the scanner 14 which, in a manner to be described later, produces an imprint of the characters corresponding to the signals transmitted. In this example, the imprint would be the eight digit number 25793864.

*Time and date print unit.*—The time and date print unit 7, as shown in FIGURE 5, preferably includes a clock 90 having hour and minute hands 91 and 92 for visually indicating the time. Also included in the unit 7 are six groups of time and date print wheels 17. Reading from left to right, the groups of print wheels 17 are adapted to print the year, month, day of the month, a.m. or p.m., hour, and minute, Operatively coupled to the day, a.m. or p.m., hour, and minute print wheels is the motor 93 for automatically advancing the associated print wheels to properly register at the print station the correct time of day and day of the month. The means (not shown) utilized to operatively couple the motor 93 and the day and time print wheels can be any of the well known Geneva transfer clock mechanisms, the details of which form no part of this invention and consequently are not described in detail herein. The means employed could, for example, be constructed in accordance with the principles set forth in U.S. Patent 2,824,777 to C. K. Geiringer. The month and year print wheels are not automatically advanced by the clock mechanism, but instead are manually advanced as required in a manner well known to those skilled in the art.

The groups of time and date print wheels 17 are arranged co-axially with the print wheels 12 of the modular printer assembly 6 and above the platens 95 of the platen assembly 9 to print the time and date on the paper 10 in line with the printout of the event. By means to be described later, the operation of the time and date printer unit 7 can be selectively controlled independently of the modular printer assembly 6 to produce, or not to produce, a time and date printout every time an event is recorded by the modular printer assembly 6.

*Platen assemblies.*—As shown in FIGURE 5, the two independently operable platen assemblies 8 and 9 cooperate with the modular printer assembly 6 and time and date printer unit 7, respectively, to produce printouts of the event and its time of occurrence, respectively. The platen assemblies 8 and 9 include a plurality of identical platens 72 and 95, respectively, mounted for rotation with co-axial shafts 96 and 97, respectively. Shaft 96 is journalled at its right end in a stationary vertical support 98 and at its left end in frame side 61; shaft 97 is likewise journalled in a stationary vertical support 99 and frame side 62. Gears 100 and 101, which are keyed to the shafts 96 and 97, respectively, mesh with the main drive assembly to rotate the platens 72 and 95, respectively, in a manner to be described later.

Figure 8:
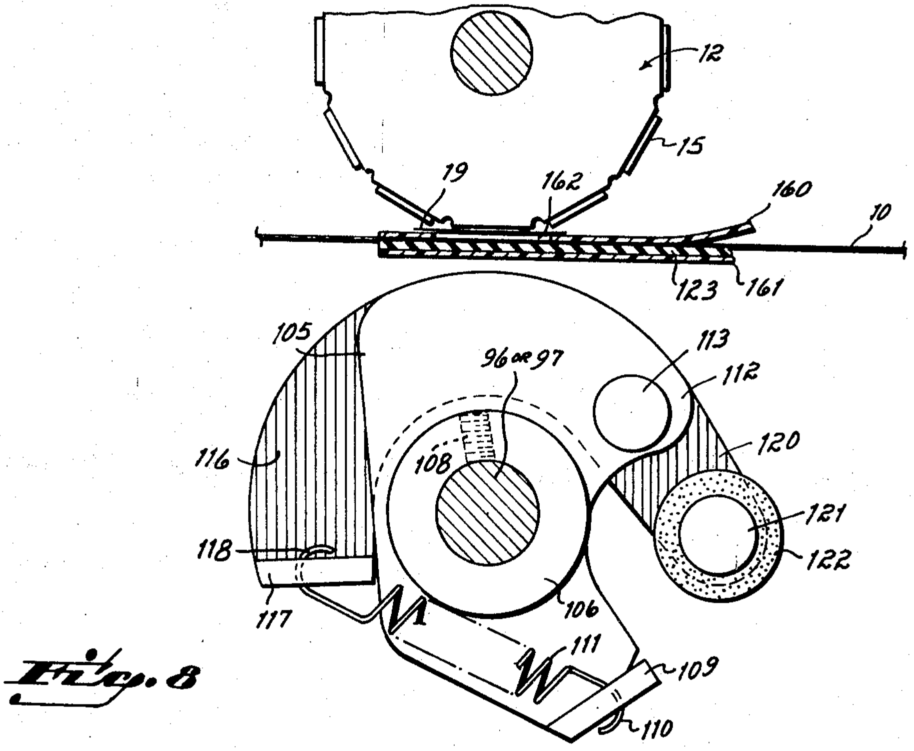
FIGURE 8 is an enlarged side elevational view of a print wheel and a platen in the non-printing position.
Figure 9:
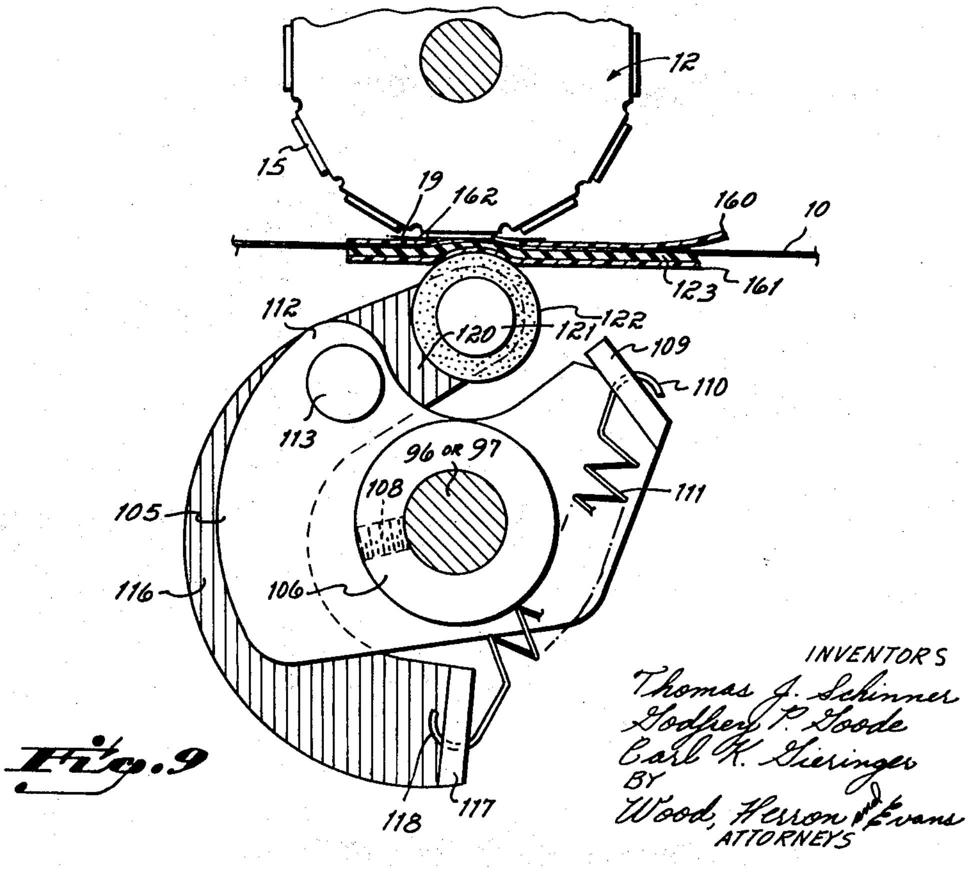
FIGURE 9 is an enlarged side elevational view of a print wheel and a platen in the printing position.

Since all of the platens 72 and 95 are structurally identical, a description of one will suffice to explain their construction and operation. As depicted in FIGURES 8 and 9 the platen includes a platen drive member 105 having an integral hub 106 which is fixedly mounted to the shaft 96 or 97 by a set screw 108. The end 109 of the platen drive member 105 is bent and provided with an aperture to accommodate the end 110 of a spring 111. The other end 112 of the platen drive member 105 has a pin 113 anchored therein. Mounted for rotation about the pin 113 is an arcuate lever 116 having a bent apertured end 117 to accommodate the end 118 of the spring 111. The other end 120 of the arcuate lever 116 has a pin 121 anchored therein for rotatably supporting a platen wheel 122. The platen wheel is preferably made of a tough plastic material.

The platen drive member 105 is designed to clear the resilient cushion 123, ribbon 19, paper 10, and character 15 regardless of its angular orientation as is clearly shown in FIGURE 8, which depicts the nonprinting position, and in FIGURE 9, which depicts the printing position. The arcuate lever 116 is constructed so that the one end 117 always clears the elements 123, 19, 10 and 15, while the other end 120 causes the platen wheel 122 to be biased against the character 15 by the spring 111 when in the printing position as shown in FIGURE 9.

In operation, a printing cycle consists of rotating the shaft 107 through one revolution, the printing actually being completed in substantially less than one revolution. As clearly shown in FIGURE 9 when the shaft 107 rotates counterclockwise the platen wheel 122 rolls across the character 15 in pressure relationship therewith producing an imprint on the paper record 10 interposed between the platen and the print wheel. The imprint is actually produced by a transfer of ink from the ribbon 19 to the paper record 10 as the platen wheel 122 rolls across resilient cushion 123 urging the paper record 10 and inked ribbon 19 against the character 15, which is located at the print station. The pressure necessary to effect the printing process is supplied by the spring 111 which becomes stretched when the platen wheel passes in rolling contact with character 15.

The torque loading on the shaft 107 due to drawing the plurality of platen wheels 122 of the platen assembly 8 or 9 across the character faces 15 may be reduced by circumferentially staggering the platens as shown in FIGURE 5. By staggering the platens 72 and 95 on the shafts 96 and 97, respectively, no more than one platen wheel 122 at any one time is being drawn across the character face 15. Thus, the torque required to rotate the eight platens 72 of the platen assembly 8 through a print cycle is reduced to approximately that required to rotate a single platen through a print cycle.

In addition to reducing the torque requirements for the shafts 96 and 97, staggering the platens also produces a smoother operation with less vibration. This increased smoothness is in addition to that realized by using the platen wheels as contrasted, for example, to using print hammers which normally introduce much vibration and noise. Thus, the printing operation of this invention is doubly smooth and vibrationless due to (1) the use of rolling platen action as shown in FIGURES 8 and 9 rather than print hammers, and (2) the circumferential staggering of the platens about their respective shafts.

*Paper feed assembly.*—As clearly shown in FIGURE 1, the printout provided by the recorder is made on a paper sheet 10 which issues from a slot 140 in the housing 1 permitting viewing or removal thereof by an operator. The paper feed assembly, as depicted in FIGURE 6, includes a rod 141 on which a roll of paper 142 is placed. The ends of the rod are journalled in resilient spring leaves 277 fixed to the frame sides 61 and 62. A pair of substantially parallel sheet metal plates 139 and 143 spaced slightly apart and each having a marginal portion 144 and 145 angularly bent to form a mouth, is provided to guide the paper record sheet 10 from the roll 142 to the print station. Plastic sheets 160 and 161 attached to a horizontal bar 163 spanning the frame sides 61 and 62 and to the sheet metal paper guide 143, respectively, also guide the paper 10 from the roll 142 to the print station. The upper plastic sheet 160 has a plurality of slots 162 (FIGURES 8 and 9) at points opposite the print wheels 12 to allow the ribbon 19 and paper 10 to be urged against the characters 15 positioned at the print station to effect an imprint when the platen wheels 122 roll across the characters 15.

To actually feed the paper 10 an eccentric feed cam 146 is provided. The feed cam 146, which is fixed to a shaft 147, is mounted for rotation in cooperation with a rubber pressure roll 148 mounted above the feed cam 146. The pressure roll 148 is mounted for rotation with a shaft 149, which is also journalled in the frame sides 61 and 62. Slots (not shown) in the guides 139 and 143 permit the feed cam 146 and the pressure roll 148 to contact the paper 10 which passes therebetween. Gears 150 and 151 which are fixed to shafts 149 and 147, respectively, and which form part of the printer drive assembly to be described later, transmit paper feeding motion from the gear 152 to the cam 146 and pressure roll 148.

A U-shaped paper roll tender 168 having a bottom 169 and a pair of vertical sides 170 is pivotally mounted about a horizontal rod 171 which passes through its sides 170. The rod 171 spans the frame sides 61 and 62. A spring (not shown) biases the bottom 169 of the tender 168 against the paper roll 142 providing sufficient drag on the paper roll 142 to keep the paper taut as it is fed by the cam 146. The sides 170 of the tender 168 loosely embrace the ends of the paper roll 142 keeping the roll 142 in proper alignment with the print heads 12 and 17 of the modular printer assembly 6 and the time and date print unit 7, respectively. Thus, the paper 10 is properly centered as it passes through the guides 139, 143 and 160, 161.

In operation, the paper feed cam 146 and the pressure roll 148 rotate one revolution per print cycle, i.e., rotate one revolution each time the platen assemblies 8 and 9 rotate through one revolution to produce an imprint on the paper record 10. Single revolution clutches, which form part of the drive assembly to be described later, limit the rotation of the platen assemblies 8 and 9 to a single revolution per print cycle. The paper 10 is actually fed only during a portion of the revolution of the cam 146 and the pressure roll 148 because it is only during a portion of the revolution that the cam 146 is urged into feeding contact with the paper 10. When the cam 146 is not in contact with the paper 10, which is the case during the initial portions of the printing cycle, no paper feeding occurs. During this initial portion of the printing cycle, the platen wheels 122 are being urged against the characters 15 to produce an imprint. After the last of the staggered platen wheels 122 has been drawn across its associated character 15, the feed cam 146 is free to initiate contact with the paper 10 to effect feeding. Thus, while one revolution of the platens 72 and 95 and feed cam 146 is needed to complete a print cycle, printing and feeding actually occur during only a portion of the print cycle. The printing occurs during the former part of the cycle; the paper feeding occurs during the latter part of the cycle. Feeding of the paper during the non-printing portion of the cycle prevents blurred printouts from occurring.

Figure 7:
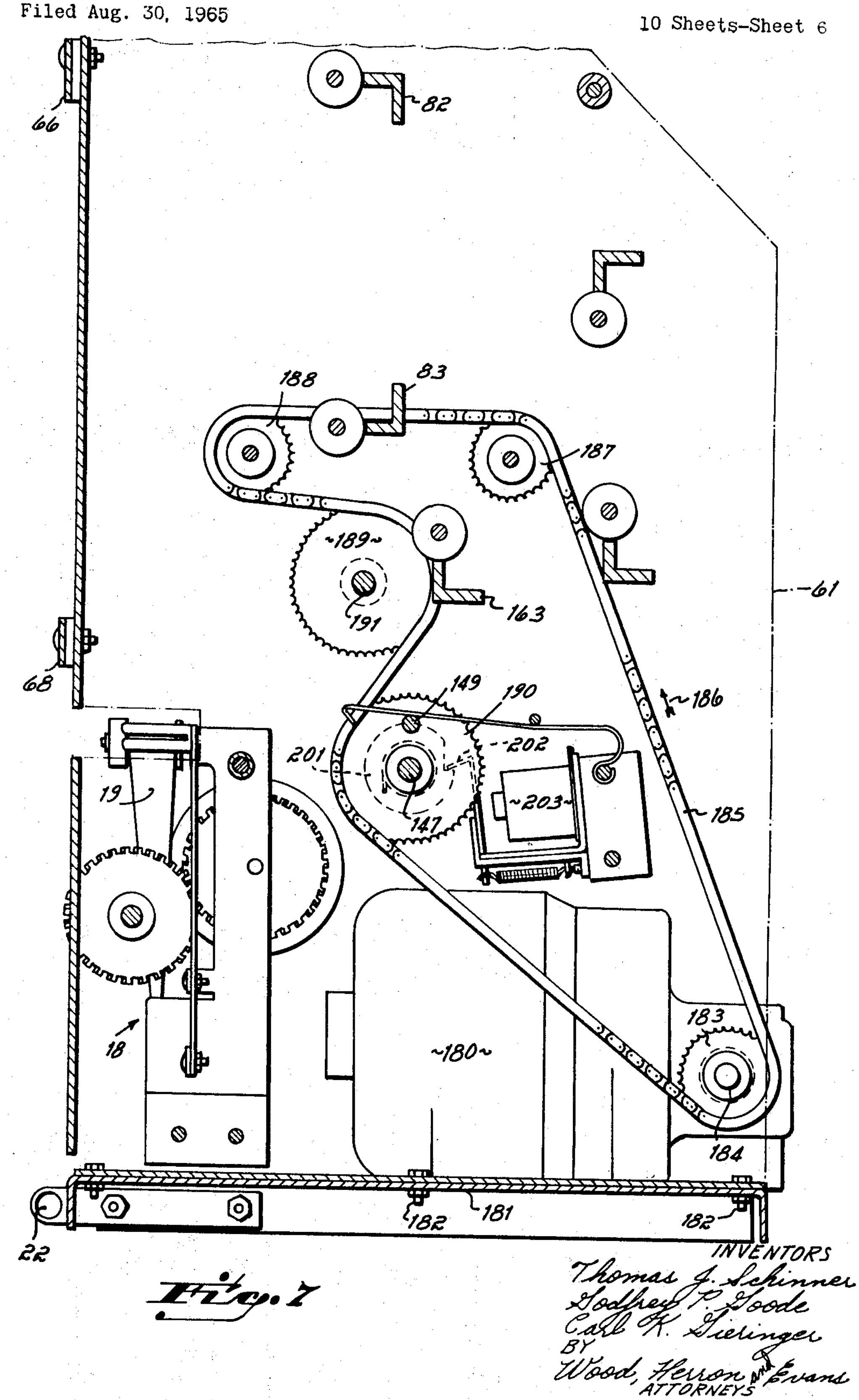
FIGURE 7 is a cross sectional view taken along line 7—7 of FIGURE 5.

*Printer drive assembly.*—The printer drive assembly includes a motor 180 mounted to the frame bottom 181 by fasteners 182 as clearly shown in FIGURE 7. The motor 180 via a sprocket 183 mounted to the shaft 184 drives a chain 185 in the direction of the arrow 186. The chain 185 is trained over idler sprockets 187 and 188, as well as over drive sprockets 189 and 190, imparting driving motion to them in the direction indicated by the arrows associated with the respective drive sprockets.

Figure 3:
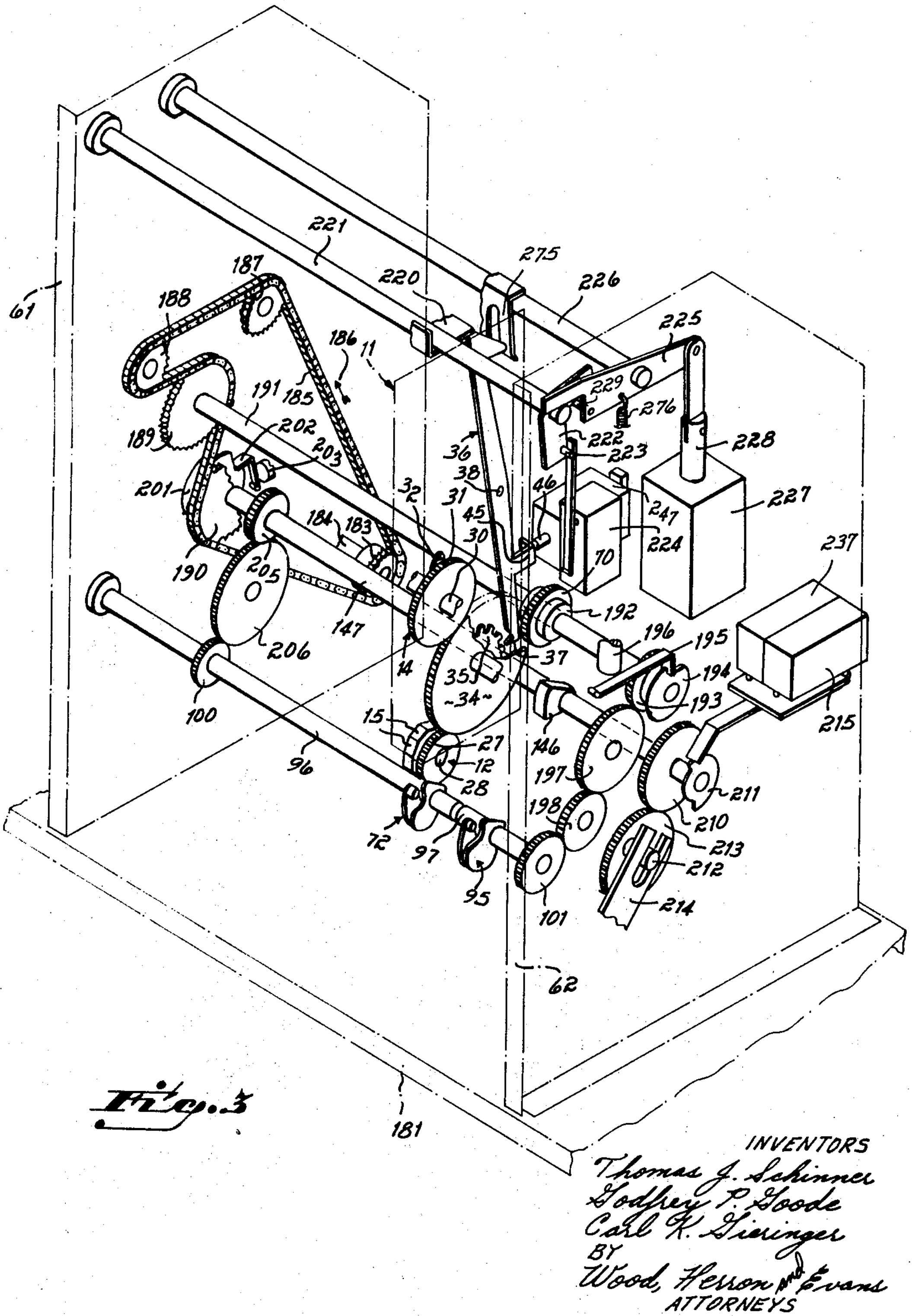
FIGURE 3 is a perspective view of the drive assembly of the recorder.

A shaft 191 is fixed to the sprocket 189 for rotation therewith as shown in FIGURES 3 and 7. A plurality of gears 70 are connected to the shaft 191 by friction clutches 192. When not locked by the engagement of the pawl 37 with the notched hub 35, the synchronizing gears 34 (only one of which is shown in FIGURE 3) are driven by the gears 70 which in turn drive the scanner gear 31, gear 27 and print wheel 12. With the synchronizing gears 34 locked by engagement of the pawls 37 and the hub 35, gear 70 is held stationary and the friction clutches slip on the shaft 191 as the latter rotates under the action of the chain drive sprocket 189. In addition to gear 70 being stationary, gears 31 and 27, as well as the print wheel 12, are also stationary. Thus, while the shaft 191 continuously rotates when the motor 180 is energized, whether or not the print wheels 12 also rotate depends on whether or not the pawls 37 have engaged the hubs 35.

Figure 4:
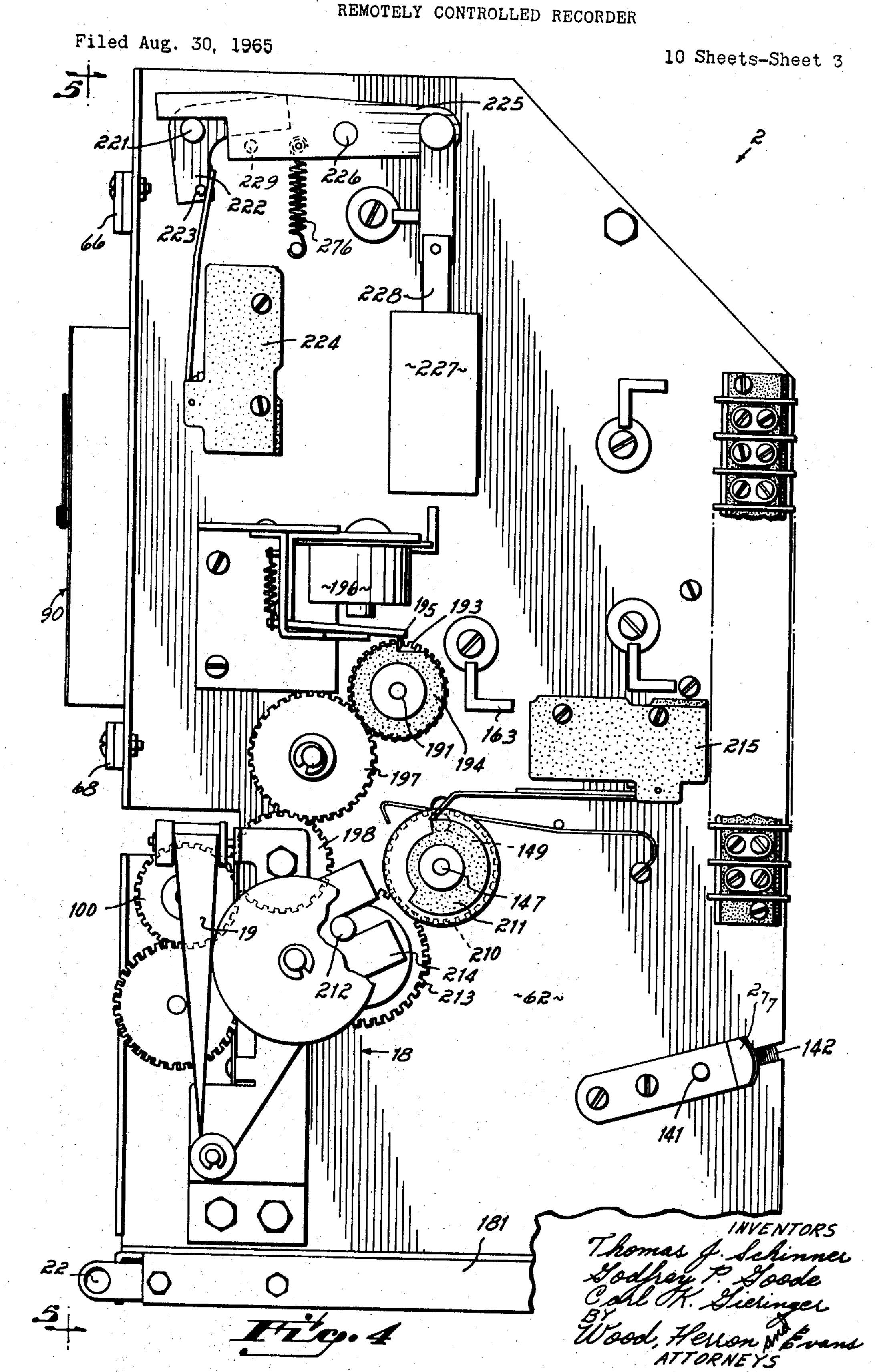
FIGURE 4 is an enlarged side elevational view of the recorder.

Also adapted to receive motion from the shaft 191 is a gear 193 which is connected to the shaft 191 through a spring clutch 194 as shown in FIGURE 4. The spring clutch 194 is normally disengaged by the action of a detent 195 which engages the notched periphery of the clutch 194 holding it against rotation. A magnet 196 actuated by suitable circuitry to be described later draws up the detent 195, disengaging it from the clutch 194, thereby permitting the clutch 194 to engage the shaft 191 and transmit motion from the shaft 191 to the gear 193. Gear 193, through idler gears 197 and 198, drives gear 101 which in turn drives the platens 95 through the shaft 97. The motion of the platens 95 produces a printout from the time and date printing unit 7 as described earlier.

The clutch 194 only remains engaged for one revolution of the shaft 191 thereby transmitting to the gear 101 the shaft 97 and the platens 95 only a single revolution of rotational motion. Motion is limited to one revolution because when the engaged clutch 194 has rotated through one revolution, the detent 195, having in the meantime been released by the de-energization of the clutch magnet 196 in a manner to be described later, again is free to engage the notched periphery of the clutch 194 disengaging the clutch. Thus, withdrawal of the detent 195 by the clutch magnet 196 frees the clutch 194 to the extent of one revolution during which time the detent 195 rides along the clutch periphery until at the end of one revolution it again engages the notch, stopping the clutch and thereby disengaging it, permitting the shaft 191 to rotate free of the gear 193.

The shaft 147 is coupled to the sprocket 190 via a spring clutch 201. The spring clutch 201 is normally held in the disengaged condition by a detent 202 which engages the clutch 201, preventing the clutch from rotating and thereby disengaging the shaft 147 and the sprocket 190 as shown in FIGURE 7. A clutch magnet 203 operated by suitable circuitry to be described later draws up the detent 202 releasing the spring clutch 201, thereby engaging the clutch 201 and permitting the chain driven sprocket 190 to drive the shaft 147. A gear 205 is fixedly mounted on the shaft 147 for rotation therewith. The gear 205 drives the gear 100 through an idler gear 206, imparting motion to the shaft 96 to which gear 100 is fixedly mounted. Thus, when the clutch magnet 203 is energized retracting the detent 202, the clutch 201 engages the shaft 147, driving the platens 72 via gears 205, 206 and 100 and the shaft 96. This motion of the platens 72 produces a printout from the print wheels 12 of the modular printer assembly 6 as described earlier.

Rotation of the shaft 147 when the magnet 203 is energized, in addition to driving the platens 72, also directly drives the feed cam 146 fixedly mounted on the shaft 147. In a manner described earlier, the rotation of the feed cam 146 advances the paper during the latter portion of the single revolution of shaft rotation while the platens 72 provide a printout during the initial portion of the shaft rotation. The rotation of the shaft 147 is limited to one revolution by the action of the clutch 201 and detent 202, which action is the same as that of the clutch 194 and detent 195 described previously. Thus, the platens 72 and the feed cam 146 rotate through only one revolution for each actuation of the magnet 203.

A gear 210 is also fixedly mounted on the shaft 147 as shown in FIGURES 3 and 4. The gear 210 drives an eccentric 212 on an idler gear 213. The eccentric 212 in turn drives the conventional ribbon feed mechanism 18 through ribbon feed actuating arm 214. The ribbon feed mechanism itself forms no part of this invention and therefore is not described in detail herein. It is sufficient to indicate that once each print cycle the ribbon feed mechanism 18 is actuated by the eccentric 212 which drives the arm 214 advancing the ribbon 19 in a conventional manner.

A cam 211, as shown in FIGURES 3 and 4, is fixedly mounted on the shaft 147 for rotation therewith. This cam actuates a pair of microswitches 215 and 237 during the last 120° of each revolution of the shaft 147. The microswitch 215, via suitable circuitry to be described later, de-energizes the clutch magnets 203 and 196. With the clutch magnets 203 and 196 de-energized, the detents 202 and 195 are free to engage the notched peripheries of the clutches 201 and 194, respectively, at the end of one revolution, thereby disengaging both the clutches 201 and 194.

A horizontal lever 220 is fixed to a horizonal rod 221 for rotational movement therewith, the rod 221 being journalled in the frame sides 61 and 62 as shown in FIGURE 3. The lever 220 normally rests atop the upper ends of the levers 36 (see FIGURE 6). However, when all the levers 36 have been pivoted by the solenoid core plungers 46 driving the pawls 37 into the notched hubs 35 and thereby stopping the print wheels 12, the lever 220 is free to drop in front of the upper ends of the levers 36. As the lever 220 drops, the rod 221 rotates, thereby rotating the angulated lever 222 fixed thereto. This angulated lever 222 in turn moves forward a pin 223 which is carried by the angulated lever 222, tripping a microswitch 224, as shown in FIGURES 3 and 4. The switch 224, which can only be actuated when all the levers 36 have pivoted engaging the pawls 37 and locking the notched hubs 35 and print wheels 12, energizes the clutch magnets 196 and 203 engaging the clutches 194 and 201 thereby initiating the print cycle. Shaft 147 then rotates through one revolution driving the platens 72 and 95 via the gear trains described previously.

As shown in FIGURES 3 and 4, a lever 225 which is rigidly mounted to a horizontal rod 226 journalled in the frame sides 61 and 62 is pivoted by a solenoid 227 overcoming a spring 276 to move the lever 220 out of engagement with the lever 36. As the lever 225 pivots under the action of the retracting solenoid plunger 228, a pin 229 carried by the lever 225 raises the horizontal portion of the angulated lever 222 thereby rotating the rod 221 and raising the lever 220 above the ends of the levers 36. In addition, as the lever 225 pivots, the rod 226 rotates urging the depending fingers 275, which are fixed to the rod 226, against the levers 36 urging the pawls 37 thereof out of engagement with the notched hubs 35. The action of the depending fingers 275 supplements the spring force exerted on the levers 36 insuring that the pawls 37 return to their normal position of disengagement with the hubs 35. Thus, pawls 37, which have a tendency to remain engaged with the hubs 35 due to the continuous torque applied to the hubs 35 by the gears 70, are positively freed under the combined action of the spring 39 and the depending fingers 275.

Figure 10:
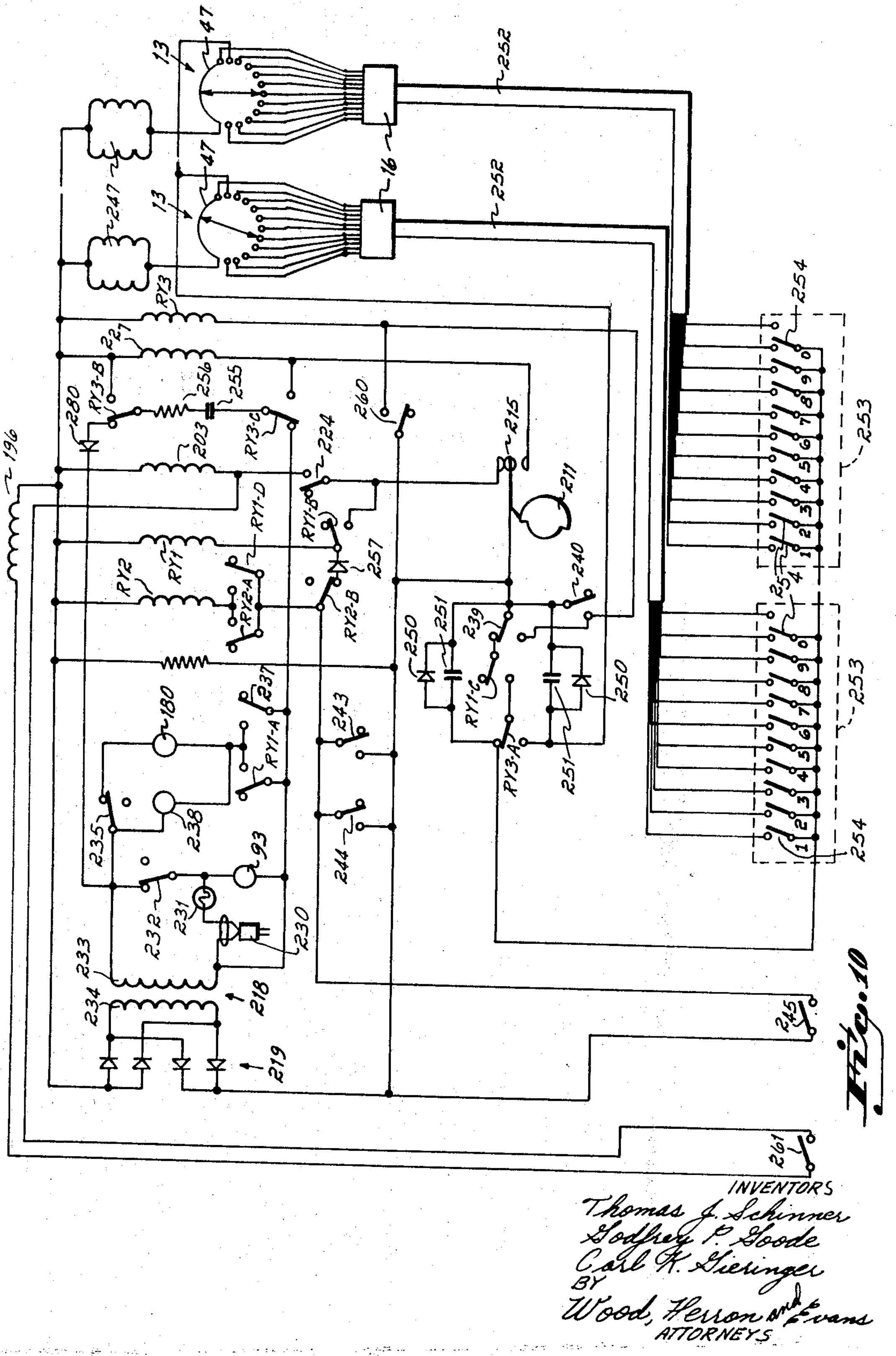
FIGURE 10 is a diagram of the electrical control circuitry for the recorder.

*Electrical control system.*—The electrical system shown in FIGURE 10 includes a step-down transformer 218 and a diode rectifying network 219 for converting the supply voltage, which is preferably 115 volts A.C., to the control system operating voltage, which preferably is 24 volts D.C. The supply voltage, which is obtained from a plug 230 insertable in an ordinary electrical supply receptacle, is applied through a fuse 231 and a main switch 232 to the primary winding of a step-down transformer 233, which produces 24 volts A.C. across the secondary winding 234. The 24 volt A.C. output voltage of the secondary winding 234 is applied to the rectifying network 219 producing 24 volts D.C. which is used throughout most of the control system to supply various relays, solenoids, etc.

The electrical system also includes the print motor 180 which drives the platens 72 and 95, the ribbon feed mechanism 18, the paper feed cam 146, and the print wheels 12 and 17. The motor 180 is connected across the 115 volt A.C. supply via switches 235, RY1–A and 237, the purpose of which will be described later.

A second motor 238, which is connected across the 115 volt A.C. supply via switches RY1–A and 237, drives a three-lobed cam (not shown) for actuating switches 239, 240 and 235. The actuation of the switches 235, 239 and 240 by the three-lobed cam over approximately a three second interval initiates an error checking and correcting program in a manner to be described later. The error checking and correcting motor 238 preferably has integral therewith a speed reduction gear train which becomes disengaged and engaged from the motor rotor when the motor is de-energized and energized, respectively. Such motors are well known in the art as exemplified by U.S. Patent No. 2,334,040 to E. L. Schellens. The motor 238 and the three-lobed cam it drives are automatically reset upon de-energization of the motor 238 by the contraction of a suitable spring means connected to the cam which during the period of motor energization extends the spring in a manner well known to those in the art.

A third motor 93, which drives the clock 90 and the time and date printer unit 7, is also connected across the 115 volt A.C. supply via the fuse 231. The motor 93 continuously operates independently of the print motor 180 and the error checking motor 238 assuring that the proper time and date are registered at the print station at all times.

The two electromagnets 196 and 203 which operate the clutches 194 and 201, respectively, are connected in parallel circuit arrangement between the negative terminal of the rectifier 219 and the switch 224. The switch 224 is mechanically closed, in a manner described earlier, when the motion of all the print wheels has been stopped. Connected between the switch 224 and the positive terminal of the rectifier 219 for further controlling the energization of the clutch electromagnets 196 and 201 is the parallel circuit arrangement of cam operated switch 215 and the serial-parallel combination of switches RY1–B, isolating diode 257, RY2–B, 243, 244 and 245. Switches 244 and 245, which are manually controlled and located at any convenient place, initiate the printing operation when closed.

The pawl kickout solenoid 227 which disengages all the pawls 37 from the hubs 35 permitting the print wheels 12 to rotate in a manner described earlier is connected across the rectifier 219 via the cam-operated switch 215 for controlling the solenoid energization.

The circuitry necessary to position the desired characters 15 of the print wheels 12 at the print station includes a plurality of identical series circuits connected in parallel across the rectifier 219 via the switches RY3–A, RY1–C, 239 and 215. Each of the series circuits for controlling the selective positioning of a character 15 at the print station includes a solenoid 247, the common terminal 47 and character terminal array 13 of the printer module 11, the receiver 16, the transmitter 252, and the character signal generator 253.

In operation, the characters 15 of a printer module 11 are positioned at the print station by closing a switch 254 in the generator 253 corresponding to the character to be positioned thereby transmitting a character signal to the appropriate character terminal 13 of the array via the transmitter 252, which is a twelve wire conductor, and the receiver 16. When the contact arm 32 rotates scanning the character terminals 13, it will detect the presence of a transmitted character signal at the character terminal in receipt thereof and complete the series circuit energizing the solenoid 247. Energization of the solenoid 247 drives its associate core 46 against the finger 45 of the lever 36 urging the pawl 37 into engagement with the hub 35 arresting the motion of the print wheel 12 and thereby positioning the selected character 15 at the print station, as shown in FIGURE 6.

The series circuit combination of a switch RY3–C, a capacitor 255, a resistor 256 and a switch RY3–B is connected in parallel with the pawl kick-out solenoid 227 and the primary winding 233 of the step-down transformer 218. This series circuit combination, which under certain conditions energizes the solenoid 227 to free the print wheels, is under the control of the error checking and correcting program to be described later. In operation, the capacitor, which is charged with the aid of the diode 280, discharges through the resistor 256 energizing the solenoid 227 when the switches RY3–B and RY3–C transfer under the control of the error checking and correcting program.

A relay RY–1 connected across the rectifier 219 via a diode 257, a switch RY2–B, and the switch 245 is provided to actuate the switches RY1–A, RY1–D, RY1–C and RY1–B, the latter switch being connected between the relay RY1 and switch 215 to seal the relay RY1. The relay RY1 is actuated by closing either of switches 245, 243 or 244 which occurs when it is desired to produce a printout.

A second relay RY–2 connected across the rectifier 229 via the switches RY2–A, RY1–D and 245 is utilized to actuate the switches RY2–A and RY2–B. Switch RY2–A seals the relay RY–2 and switch RY2–B prevents the printer from continuously printing in a manner to be described later. Relay RY2 is actuated by the transferring of the switch RY1–D which occurs when relay RY1 is actuated.

A third relay RY3 alternatively connected across the rectifier 229 via parallel circuit paths through switch 260 or switch 240 functions to actuate the kick-out solenoid 227, freeing the print wheels, and if switches RY1–C and 239 are actuated, to transmit the fault symbol signal to the arrays 13 causing all the printer modules 11 to attempt to print the fault symbol T. The relay RY3 is actuated manually by closing switch 260 or automatically when switch 239 is actuated by the three-lobed cam which occurs under the control of the error checking and correcting program should the printer fail to printout within two seconds of initiation of a print cycle by closing either of the switches 245 or 244.

A switch 261 is in series with the time and date clutch magnet 196 to permit disablement of the clutch electromagnet 196 if it is desired to print only the transmitted characters, i.e., if it is desired to produce a printout of the event without a printout of the time and date thereof. Disablement of the clutch electromagnet 196 prevents the clutch 194 from engaging, thereby preventing operation of the time and date platent 95.

Capacitors 251 and diodes 250 are connected in parallel with the switches RY3–A and RY1–C to suppress arcing upon the opening and closing of these switches.

OPERATION

Figure 13:
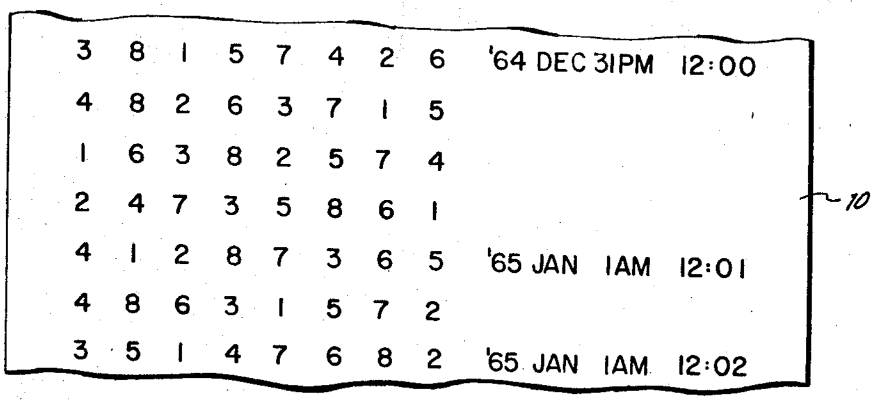
FIGURES 13, 14 and 15 illustrate some of the different printout modes possible with the recorder of this invention.

For illustrative purposes, assume it is desired to print the first and second lines in the sample printout appearing in FIGURE 13. Since the first line in FIGURE 13 is to contain the time and date printout as well as the printout of the event, it is necessary as a first step to close the switch 261. This permits the time and date clutch magnet 196 to engage the time and date clutch 194, driving the platens 95 to produce a time and date printout. Assuming the supply plug 230 is connected to a suitable voltage source, the time and date print wheels 17 will be driven by the motor 93, automatically positioning the print wheels 17 at the print station to produce printouts of the proper time and date when the platens 95 are actuated.

The next step is to set up the event in the character generators 253 to facilitate the generation of character signals corresponding to the event to be printed. This is accomplished by closing the appropriate switches 254 in each of the character generators 253. Specifically, to print event 38157426, the switches indicated in the following table are closed:

| Character Generator | 1 | 2 | 3 | 4 | 5 | 6 | 7 | 8 |
|---|---|---|---|---|---|---|---|---|
| Switch | 3 | 8 | 1 | 5 | 7 | 4 | 2 | 6 |

To initiate the printing operation, either switch 245 or 244 is closed. Closing either of these switches transmits the character signals from the character generators 253 via the transmitters 252 to the receivers 16. The transmission occurs due to energization of the relay RY1 via either switch 245 or 244, switch RY1–B which is normally closed, and the diode 257. Relay RY1, which seals through normally open switch RY1–B, in turn actuates normally open switches RY1–C, thereby completing the circuit from the positive terminal of the rectifier 219 to the generators 253 via normally closed switches 239 and RY3–A. With power applied to the generators 253, character signals are transmitted on all lines emanating from the closed switches 254 in the character generators 253. At each receiver 16, a character signal is received and fed to the appropriate character terminal 13 of the array.

Energization of relay RY1 by closing either of the print switches 244 or 245, in addition to completing the necessary circuit for transmitting the character signals, also actuates normally open switch RY1–A, energizing the print motor 180 and the error checking and correcting motor 238. The print motor 180 is energized through the normally closed switch 235. The print motor 180 imparts motion to the sprockets 189 and 190 via the drive chain 185. The sprocket 189 in turn drives the shaft 191 which, through friction clutches 192, drives the gears 70. The gears 70 via the synchronizing gears 34 initiate the scanning of the character terminal arrays 13 by rotating the scanners including the contact arms 32, and print wheels 12. Each scanner rotates until the contact 33 of its arm 32 arrives at the character terminal 13 in receipt of a character signal. When this occurs, i.e., when an arm 32 has rotated to a point where it is connected between the common terminal 47 and the character terminal 13 in receipt of a character signal, a circuit is completed between the rectifier 219 and its associated solenoid 247. Energization of the solenoid 247 expels its core 46 against the abutment 45, driving the pawl 37 into engagement with the notched hub 35, thereby arresting the motion of the synchronizing gear 34, the print wheel 12, and the scanner 14. At this same instant, the character 15 on the print wheel 12, corresponding to the character signal transmitted, is positioned at the print station. Thus, when the pawl 37 stops the synchronizing gear 34 in response to the sensing of a character signal by the scanner 14, it also stops the desired character 15 at the print station. In the example given, namely, printing the event 38157426, the eight scanners of the modular printer assembly 6 would complete circuits to their associated magnets 247, actuating the pawls 37 and stopping the characters 3, 8, 1, 5, 7, 4, 2 and 6 at the print station.

When all of the desired characters of the event have been positioned at the print station, the lever 220 drops down in front of the levers 36. As the lever 220 drops, the rod 221 rotates, turning the angulated lever 222, thereby tripping the switch 224 which completes a circuit to the clutch magnets 196 and 203. When the clutch magnets 196 and 203 are energized, detents 195 and 202 disengage the notched periphery of their associated clutches 201 and 194 allowing the clutches to rotate and engage, driving through one revolution the shaft 147 and the gear 193, respectively. The shaft 147 drives the platens 72 via the gears 205, 206 and 100, and the shaft 96 producing a printout of the event. At the same time, the gear 193 drives the platens 95 via the gears 197, 198 and 101 and the shaft 97, producing a printout of the time and date. As discussed previously, both of these printouts occur during approximately the first one-half of a revolution of the shaft 147.

After the shaft 147 has rotated approximately ⅝ of a revolution, the cam 211 trips the switches 215 and 237, de-energizing the relay RY1 and the clutch magnets 196 and 203, energizing the pawl kick-out solenoid 227, and closing switch 237. De-energization of relay RY1 opens switch RY1–C, de-energizing the solenoids 247 and retracting the plungers 46. De-energization of the relay RY1 also opens the switch RY1–A. However, opening switch RY1–A does not remove power from the motors 180 and 232 because the alternate connection to the power supply through the cam operated switch 237 closes at the same instant. Energization of the pawl kick-out solenoid 227 rotates the lever 225, raising the pin 229 which in turn rotates the lever 222 and shaft 221, raising the lever 220 above the levers 36, permitting the pawls to disengage the notched hubs. Rotation of the lever 225 by the core 228 of the kick-out solenoid 227 also rotates the bar 226 which urges the depending fingers 275 against the levers 36, positively disengaging the pawls 37 and freeing the print wheels 12.

As the shaft 147 continues rotating, the feed cam 146 engages the paper 10 advancing it one line. As discussed previously, the feed cam advances the paper 10 only during the latter portion of the one revolution of the shaft 147.

When the shaft 147 and the gear 193 complete one revolution, the detents 195 and 202, which have been previously released by the de-energization of their associated clutch magnets 196 and 203, engage the notched clutch peripheries, disengaging the clutches 201 and 194. As the cam 211 on the shaft 147 completes one revolution, the switches 237 are opened, cutting off power to the motors 180 and 238, and switch 215 transfers, readying the electrical control system for the next cycle. However, another cycle cannot occur until either switch 243 or 244 is opened, de-energizing the relay RY2, which in turn returns the switch RY2–B to its normally closed position, permitting a circuit to be completed to the relay RY1 at the start of the next print cycle. Thus, continuous printing of the same event is prevented.

Printing the second line of FIGURE 13 is accomplished in the same manner as used to print the first line except for two slight changes in procedure. Since the second line of FIGURE 13 does not contain a time and date printout, but only the event printout, the switch 261 is opened, disabling the time and date clutch magnet 196 which prevents the clutch 194 from engaging the shaft 191 and rotating the platens 95 to produce a printout of the time and date. The other change in procedure is to set up the event 48263715 in the character generators 253. Having done both of these steps, either of print switches 243 or 244 can be closed to initiate the printing operation and produce a printout in the manner described previously.

If all the characters 15 constituting a printout are not positioned at the print station because, for example, the type ribbon 19 becomes bunched at the print station preventing the print wheels 12 from rotating, all of the pawls 37 do not engage the hubs 35. When this occurs, the lock lever 220 does not drop down and rotate lever 222, to trip the switch 224. When switch 224 fails to trip, the clutch magnets 196 and 203 are not actuated and the clutches 201 and 194 never engage. Hence, the platens 72 and 95 are never driven to produce a printout, the cam 211 never trips the switches 215 and 237 to de-energize the magnets 247 and solenoid 227 which free the print wheels, and the cam 211 never cuts off the power to the motors 180 and 238. In effect, the entire printer is immobilized if the switch 224 is never tripped due to a failure of all the characters 15 to become properly positioned at the print station.

To minimize errors due to the situation outlined above, a three-step error checking and correcting program is carried out by the electrical control system, particularly by the motor 238, three-lobed cam, and switches 239, 240, and 235. When either of the print switches 245 or 244 is closed initiating the printing operation, relay RY1 is energized, actuating the switch RY1–A which starts the print motor 180 and the error-checking and correcting motor 238.

The error-checking and correcting motor 238 drives a three-lobed cam (not shown). If the printer does not provide a printout in two seconds, completing the printing cycle, the cam driven by the motor 238 transfers the switch 239, momentarily energizing relay RY3 and de-energizing the magnets 247. The relay RY3 transfers the switches RY3–B and RY3–C, disconnecting the 115 volt A.C. supply from the capacitor 255 and resistor 256 and permitting the capacitor 255 to discharge across the pawl kick-out solenoid 227, thereby freeing the print wheels 12. With the print wheels free to rotate, the three-lobed cam re-transfers switch 239 which de-energizes the relay RY3. Re-energization of relay RY3 again connects the 115 volt A.C. supply across the pawl kick-out solenoid and, in addition, completes the circuit to the character generators 253. Thus, the printer again attempts to printout the characters set up in the generators 253.

Should the second attempt at positioning all the desired characters be successful, a printout is accomplished in the usual manner. However, should the second attempt fail, switch 239 is not transferred, but switch 240 does transfer. When switch 240 transfers, the relay RY3 is again energized and in the manner previously described, de-energizes the magnets 247 and energizes the solenoid 227, thereby freeing the print wheels 12. Energization of the relay RY3 also transfers the switch RY3–A, transmitting a fault symbol signal to the fault symbol terminals 13 of all the arrays. Since the print wheels 12 are free to rotate, the fault symbol signals should be sensed and the print wheels 12 stopped, positioning the fault symbol at the print station, thereby providing a printout in the usual manner. If the fault symbols are, in fact, properly positioned at the print station, a printout of the fault symbols occurs along with the time and date, indicating that an event was not recorded. The printer then continues through its cycle in the usual manner to ready the printer for the printing of the next event.

Should the fault symbols not be properly positioned at the print station, the three-lobed cam will continue rotating, opening the switch 235 which cuts off power to the print motor 180. The switch 239 will also be transferred, cutting off the power to the magnets 247 and energizing the kick-out solenoid 227, thereby freeing the print wheels 12. The printer is now inoperative until manually reset by turning off the main switch 232, which de-energizes the motor 238, and then turning on the main switch 232. The printer remains inoperative until the above procedure is carried out because the motor 238 is "wound up." That is, the motor 238 can no longer rotate the three-lobed cam because the motor 238 has insufficient torque to overcome the spring bias which tends to return the three-lobed cam to the reset position when the power to the motor is cut off. Hence, the motor 238 stalls.

If at any time it is desired to check the operating conditions of the printer, ganged switches 243 and 260, preferably located at the printer, can be closed. Closing these switches initiates a printout of the fault symbols, enabling the operator to determine if the printer is free of malfunctions of the type which cause the error checking and correcting program to be carried out as, for example, bunching of the type ribbon 19. Specifically, referring to FIGURE 10, closing switch 243 initiates the printing operation in the manner previously described in conjunction with the closing of the print switches 245 or 244. However, instead of printing out an event, a printout of the fault symbols occurs. This results because ganged switch 260 closes, energizing the relay RY–3, which energizes the kickout solenoid 227, thereby disengaging the pawls 37 and freeing the print wheels 12 in a manner described earlier. In addition, the relay RY–3 transfers the switch RY3–A, thereby transmitting fault symbol signals to the fault symbol terminals 13 of the arrays. Having disengaged the pawls 37 and transmitted fault symbol signals to the arrays, the scanners 14 are free to scan the terminals, sense the receipt of the fault symbol signals, cause the print wheels to be locked in printing position, and effect a printout of the fault symbols by platen action in the usual manner. Thus, a convenient way is provided for checking the printer for malfunctions.

Figure 14:
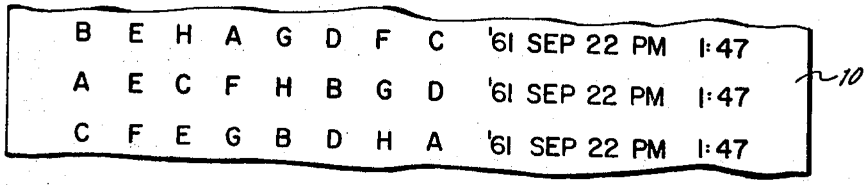
Figure 15:
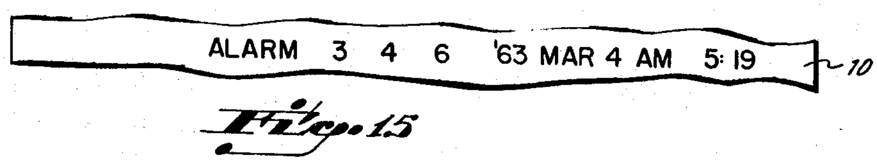

While the invention has been described with reference to a preferred embodiment which utilized eight printer modules 11, each adapted to print ten digits and a test symbol, it will be obvious to those skilled in the art that the number of printer modules 11 can be varied to suit the needs of the user. In addition, the type of printout, i.e., the printout mode, can be varied. For example, alphabetic symbols can be utilized as shown in the sample printouts of events depicted in FIGURE 14 in contrast to numeric printouts of events depicted in FIGURE 13. If desired, instead of alphabetic or numeric characters, words may be utilized as shown in FIGURE 15. To accomplish these changes in printout modes, it is only necessary to replace the printer modules 11 with different printer modules having print wheels containing the desired characters or words about their peripheries. As described earlier, the changing of printer modules 11 is a simple operation achieved by merely slipping the interchangeable modules 11 in or out of the modular printer assembly 6.

Having described our invention, we claim:

1. A remotely controlled printing apparatus comprising:
 a plurality of print heads each having a plurality of characters thereon;
 a plurality of signal receivers each having a plurality of channels for receiving one of a plurality of transmitted character signals, each of said channels corresponding to a different one of said characters on said print head;
 drive means coupled to said print heads for moving said characters past a print station;
 a plurality of channel scanners associated with said receivers for sensing the recept of character signals by said receivers, each of said scanners sensing the channels of its associated receiver in synchronism with the movement of the characters of its associated print head past said print station; and
 a plurality of braking means responsive to the outputs of said channel scanners for stopping the motion of said print heads when the characters corresponding to the channels which have received character signals are at said print station.

2. In a printer which includes a frame member;
 a plurality of print heads mounted to said frame member, each of said print heads having a plurality of characters thereon; a print station; and means for moving said print head relative to said print station to selectively position different ones of said characters at said print station; the improvement comprising:
  a plurality of concentric drive members rotatably mounted to said frame opposite said plurality of print heads;
  a plurality of platen wheels;
  a plurality of support elements for rotatably supporting said plurality of platen wheels, each of said elements being pivotally and eccentrically mounted on a different one of said drive members;
  a plurality of biasing means respectively connected between said support elements and said drive members for biasing said platen wheels against said print heads when said drive members rotate; and
  means for rotating said drive members for bringing said platen wheels into rolling pressure relationship with their associated print heads to print the characters located at said print station onto a record sheet interposed therebetween.

3. A platen device comprising:
 a drive member adapted to be mounted for rotation about an axis;
 a platen wheel;
 a support element for rotatably supporting said platen wheel, said element being pivotally and eccentrically mounted on said drive member; and
 biasing means connected between said support element and said drive member for biasing said platen wheel against a suitably positioned print head as said drive member rotates drawing said platen wheel in rolling relationship across said print head.

4. A remotely controlled printing apparatus comprising:
 a frame;
 a plurality of signal receivers each having character channels for receiving one of a plurality of character signals from a remotely located transmitter, said receivers being mounted on said frame;
 a print station;
 a plurality of modular printing devices detachably connected to said frame, said devices each comprising: a subframe; a print head mounted on said subframe for motion relative to said print station whereby characters on said print head may be drawn past said print station; a scannable array of character terminals mounted on said subframe, said terminals being detachably connected by circuit means to the character channels of its associated receiver; a scanner mounted on said subframe for motion relative to said array of character terminals whereby said character terminals may be scanned to detect the receipt of a character signal by one of said character channels of said associated receiver;
 motor means mounted on said frame and drivingly coupled to said print heads and said scanners for moving said scanners and said print heads, said scanner scanning said character terminals in synchronism with the movement of said characters past said print station; and
 means responsive to the sensing of said transmitted character signals by said scanners for arresting the motion of said print heads thereby positioning at said print station the characters corresponding to the sensed character signals.

5. A modular printing device comprising:
 a frame;
 a print head having a plurality of characters thereon, said print head being mounted on said frame for motion relative to a print station whereby said characters may be drawn past said print station;
 a scannable array of character terminals mounted on said frame, said terminals being capable of detachable connection to character channels of a character signal receiver.
 a scanner mounted on said frame for motion relative to said array of terminals for sensing the receipt of a character signal by said character signal receiver; and
 synchronizing means mounted for relative motion on said frame, said means being drivingly coupled to said print head and said scanner for moving said characters past said print station in synchronism with the scanning of said character terminals.

6. A remotely controlled printing apparatus comprising:

a frame;

a plurality of signal receivers each having character channels for receiving a plurality of character signals from a remotely located transmitter, said receivers being mounted on said frame;

a print station;

a plurality of modular printing devices detachably connected to said frame, said devices each comprising: a subframe; a print head mounted on said subframe for motion relative to said print station whereby characters on said print head may be drawn past said print station; a scannable array of character terminals mounted on said subframe, said terminals being detachably connected by circuit means to the character channels of its associated receiver; a scanner mounted on said subframe for motion relative to said array of character terminals whereby said character terminals may be scanned to detect the receipt of a character signal by one of said character channels of said associated receiver;

motor means mounted on said frame and drivingly coupled to said print heads and said scanners for moving said scanners and said print heads, said scanner scanning said character terminals in synchronism with the movement of said characters past said print stations;

means responsive to the sensing of a character signal by said scanner for arresting the motion of said print head thereby positioning at said print station the character corresponding to the sensed character signal;

time and date print heads mounted on said frame for motion relative to said print station whereby characters on said time and date print heads may be drawn past said print station; and clock motor means mounted on said frame, said clock motor means being drivingly coupled to said time and date print heads for advancing said characters on said time and date print heads to said print stations for automatically and continuously registering the proper time and date at said print station.

7. A remotely controlled printing apparatus comprising:

a frame;

a plurality of signal receivers each having character channels for receiving a plurality of character signals from a remotely located transmitter, said receivers being mounted on said frame;

a print station;

a plurality of modular printing devices detachably connected to said frame, each of said devices comprising: a subframe; a print head having a plurality of characters thereon and a fault symbol, said print head being mounted on said subframe for motion relative to said print station whereby said characters and symbol on said print head may be drawn past said print station; a scannable array of terminals mounted upon said subframe, said scannable array of terminals comprising a plurality of character terminals and a fault symbol terminal, said plurality of character terminals being detachably connected by circuit means to the respective character channels of its associated receiver; a scanner mounted on said subframe for motion relative to said terminals whereby said terminals may be scanned to detect the receipt of a transmitted character signal by one of said channels of said associated receiver;

motor means mounted on said frame, said motor means being drivingly coupled to said print heads and said scanners for synchronously moving said scanners and said print heads, said scanners sensing said character terminals in synchronism with the movement of said characters past said print station;

braking means responsive to the sensing of signals by said scanners for arresting the motion of said print heads thereby positioning at said print station the characters corresponding to said sensed character signals;

fault detection means responsive to the mispositioning at said print station of said characters corresponding to said sensed character signals for generating a fault symbol signal;

means for applying said fault symbol signal to said fault symbol terminal; and means to actuate said motor means to initiate the scanning of said terminals and the positioning of said symbol at said print station in response to the detection of a fault.

8. A remotely controlled printing apparatus comprising:

a frame;

a plurality of signal receivers each having character channels for receiving a plurality of character signals from a remotely located transmitter, said receivers being mounted on said frame;

a print station;

a plurality of modular printing devices detachably connected to said frame, each of said devices comprising: a subframe; a print head having a plurality of characters thereon and a fault symbol, said print head being mounted on said subframe for motion relative to said print station whereby said characters and symbol on said print head may be drawn past said print station; a scannable array of terminals mounted upon said subframe, said scannable array of terminals comprising a plurality of character terminals and a fault symbol terminal, said plurality of character terminals being detachably connected by circuit means to the respective character channels of its associated receiver; a scanner mounted on said subframe for motion relative to said terminals whereby said terminals may be scanned to detect the receipt of a transmitted character signal by one of said channels of said associated receiver;

motor means mounted on said frame, said motor means being drivingly coupled to said print heads and said scanners for synchronously moving said scanners and said print heads, said scanners sensing said character terminals in synchronism with the movement of said characters past said print station;

braking means responsive to the sensing of signals by said scanners for arresting the motion of said print heads thereby positioning at said print station the characters corresponding to said sensed character signals;

fault detection means responsive to the mispositioning at said print station of said characters corresponding to said sensed character signals for generating a fault symbol signal;

means for applying said fault symbol signal to said fault symbol terminal;

means to actuate said motor means to initiate the scanning of said terminals and the positioning of said symbol at said print station in response to the detection of a fault;

time and date print heads mounted on said frame for motion relative to said print station whereby characters on said time and date print heads may be drawn past said print station;

clock motor means mounted on said frame, said clock motor means being drivingly coupled to said time and date print heads for advancing said characters on said time and date print heads to said print station for automatically and continuously registering the proper time and date at said print station; and first and second platen assemblies mounted on said frame for cooperation with said time and date print heads and said plurality of print heads, respectively, each of said platen assemblies comprising: a plurality of concentric drive members rotatably mounted to said frame opposite said plurality of print heads; a plurality of platen wheels; a plurality of support elements for rotatably supporting said plurality of platen wheels, each of said elements being pivotally and eccentrically mounted on a different one of said drive members; a plurality of biasing means respectively connected between said support elements and said drive members for biasing said platen wheels against said print heads when said drive members rotate; and means for rotating said drive members for bringing said platen wheels into rolling pressure relationship with their associated print heads to print the characters located at said print station onto a document interposed therebetween.

9. A remotely controlled printing apparatus comprising:

a frame;

a plurality of signal receivers each having character channels for receiving a plurality of character signals from a remotely located transmitter, said receivers being mounted on said frame;

a print station;

a plurality of modular printing devices detachably connected to said frame, said devices each comprising: a subframe; a print head mounted on said subframe for motion relative to said print station whereby characters on said print head may be drawn past said print station; a scannable array of character terminals mounted on said subframe, said terminals being detachably connected by circuit means to the character channels of its associated receiver; a scanner mounted on said subframe for motion relative to said array of character terminals whereby said character terminals may be scanned to detect the receipt of a character signal by one of said character channels of said associated receiver;

motor means mounted on said frame and drivingly coupled to said print heads and said scanners for moving said scanners and said print heads, said scanners scanning said character terminals in synchonism with the movement of said characters past said print station;

means responsive to the sensing of character signals by said scanners for arresting the motion of said print heads thereby positioning at said print station the characters corresponding to the sensed character signals;

time and date print heads mounted on said frame for motion relative to said print station whereby characters on said time and date print heads may be drawn past said print station;

clock motor means mounted on said frame, said clock motor means being drivingly coupled to said time and date print heads for advancing said characters on said time and date print heads to said print station for automatically and continuously registering the proper time and date at said print station;

first and second platen assemblies mounted on said frame for cooperation with said time and date print heads and said plurality of print heads, respectively, each of said platen assemblies comprising: a plurality of concentric drive members rotatably mounted to said frame opposite said print heads; a plurality of platen wheels; a plurality of support elements for rotatably supporting said plurality of platen wheels, each of said elements being pivotally and eccentrically mounted on a different one of said drive members; a plurality of biasing means respectively connected between said support elements and said drive members for biasing said platen wheels against said print heads when said drive members rotate; and means for rotating said drive members for successively bringing said platen wheels into rolling pressure relationship with their associated print heads to successively print the characters located at said print station onto a record sheet interposed therebetween.

10. A remotely controlled printing apparatus comprising:

a frame;

a plurality of signal receivers each having character channels for receiving a plurality of character signals from a remotely located transmitter, said receivers being mounted on said frame;

a print station;

a plurality of modular printing devices detachably connected to said frame each of said devices comprising: a subframe; a print head having a plurality of characters thereon and a fault symbol, said print head being mounted on said subframe for motion relative to said print station whereby said characters and symbol on said print head may be drawn past said print station; a scannable array of terminals mounted upon said subframe, said scannable array of terminals comprising a plurality of character terminals and a fault symbol terminal, said plurality of character terminals being detachably connected by circuit means to the respective character channels of its associated receiver; a scanner mounted on said subframe for motion relative to said terminals whereby said terminals may be scanned to detect the receipt of a transmitted character signal by one of said channels of said associated receiver;

motor means mounted on said frame, said motor means being drivingly coupled to said print heads and said scanners for synchronously moving said scanners and said print heads, said scanners sensing said character terminals in synchronism with the movement of said characters past said print station;

braking means responsive to the sensing of signals by said scanners for arresting the motion of said print heads thereby positioning at said print station the characters corresponding to said sensed character signals;

fault detection means responsive to the mispositioning at said print station of said characters corresponding to said sensed character signals for generating a fault symbol signal;

means for applying said fault symbol signal to said fault symbol terminal;

means to actuate said motor means to initiate the scanning of said terminals and the positioning of said symbol at said print station in response to the detection of a fault;

time and date print heads mounted on said frame for motion relative to said print station whereby characters on said time and date print heads may be drawn past said print station;

clock motor means mounted on said frame, said clock motor means being drivingly coupled to said time and date print heads for advancing said characters on said time and date print heads to said print station for automatically and continuously registering the proper time and date at said print station; and first and second platen assemblies mounted on said frame for cooperation with said time and date print heads and said plurality of print heads, respectively, each of said platen assemblies comprising: a plurality of concentric drive members rotatably mounted to said frame opposite said plurality of print heads; a plurality of platen wheels; a plurality of support elements for rotatably supporting said plurality of platen wheels, each of said elements being pivotally and eccentrically mounted on a different one of said drive members at different points circumferentially spaced from each other; a plurality of biasing means respectively connected between said support elements and said drive members for biasing said platen wheels against said print heads when said drive members rotate; and means for rotating said drive members for successively bringing said platen wheels into rolling pressure relationship with their associated print heads to successively print the characters located at said print station onto a record sheet interposed therebetween.

11. A remotely controlled printing apparatus comprising:

a frame;

a plurality of signal receivers each having character channels for receiving one of said plurality of character signals from a remotely located transmitter, said receivers being mounted on said frame;

a print station;

a plurality of modular printing devices detachably connected to said frame, said devices each comprising: a subframe; a print head mounted on said subframe for motion relative to said print station whereby characters on said print head may be drawn past said print station; a scannable array of character terminals mounted on said subframe, said terminals being detachably connected by circuit means to the character channels of its associated receiver; a scanner mounted on said subframe for motion relative to said array of character terminals whereby said character terminals may be scanned to detect the receipt of a character signal by one of said character channels of said associated receiver;

motor means mounted on said frame and drivingly coupled to said print heads and said scanners for moving said scanners and said print heads, said scanners scanning said character terminals in synchronism with the movement of said characters past said print station;

means responsive to the sensing of transmitted character signals by said scanners for arresting the motion of said print heads thereby positioning at said print station the characters corresponding to the sensed character signals;

a platen assembly mounted on said frame for cooperation with said plurality of print heads, said platen assemblies comprising: a plurality of concentric drive members rotatably mounted to said frame opposite said plurality of print heads; a plurality of platen wheels; a plurality of support elements for rotatably supporting said plurality of platen wheels, each of said elements being pivotally and eccentrically mounted on a different one of said drive members; a plurality of biasing means respectively connected between said support elements and said drive members for biasing said platen wheels against said print heads when said drive means rotate; and means for rotating said drive members for bringing said platen wheels into rolling pressure relationship with their associated print heads to print the characters located at said print station onto a record sheet interposed therebetween.

12. A remotely controlled printer comprising:

a frame;

a print station;

a plurality of print wheels coaxially mounted in said frame for rotary motion relative to said print station, each of said print wheels having a plurality of characters equally spaced about its periphery;

a plurality of time and date print wheels mounted coaxially in said frame for rotary motion relative to said print station, said plurality of time and date print wheels being positioned adjacent said plurality of character print wheels, said wheels having a common tangent spatially coincident with said print station;

clock motor means mounted on said frame, said clock motor means being drivingly coupled to said time and date print wheels for advancing time and date characters located about the peripheries of said time and date print wheels to said print station for automatically and continuously registering the proper time and date at said print station;

a plurality of receivers, each having a plurality of channels for receiving one of a plurality of transmitted character signals, each of said channels corresponding to a different one of said characters on said print wheel;

drive means coupled to said character print wheels, said drive means being responsive to character signals received by said receiver to move said print wheels for positioning at said print station the characters corresponding to said received character signals; and selectively operable means mounted to said frame opposite said print wheels to produce at said print station a printout on a single line of a record sheet, said printout corresponding to said characters positioned at said print station.

13. A remotely controlled printing apparatus comprising:

a plurality of print heads each having a plurality of characters thereon, a plurality of signal receivers, each of said receivers being associated with a different one of said print heads and having a plurality of channels for receiving transmitted character signals, said channels of a receiver corresponding to the characters on the print head associated with said receiver, a plurality of channel scanners associated respectively with said plurality of receivers for sensing the receipt of characters signals by said receivers, and means coupled to said print heads for moving said characters past a print station in synchronism with the sensing of said channels by said scanners and stopping the motion of said print heads when the characters corresponding to the channels which have received character signals are at said print station.

References Cited

UNITED STATES PATENTS

| | | | |
|---|---|---|---|
| 2,176,371 | 10/1939 | Wahl | 101—269 |
| 2,944,867 | 7/1960 | Gregory | 346—59 |
| 2,982,205 | 5/1961 | Maul | 101—269 |
| 3,004,817 | 10/1961 | Wapner | 346—141 |
| 3,120,420 | 2/1964 | Gregory | 346—59 |
| 3,189,911 | 6/1965 | Furniss | 346—60 |
| 3,221,653 | 12/1965 | Bell et al. | 101—269 |

RICHARD B. WILKINSON, *Primary Examiner.*

MICHAEL LORCH, *Assistant Examiner.*

UNITED STATES PATENT OFFICE
CERTIFICATE OF CORRECTION

Patent No. 3,371,349 February 27, 1968

Thomas J. Schinner et al.

It is hereby certified that error appears in the above numbered patent requiring correction and that the said Letters Patent should read as corrected below.

Column 17, line 39, beginning with "1. A remotely" cancel all to and including "print station." in line 60, same column 17; Column 17, line 61, "2." should read -- 1. --. Column 18, line 13, "3." should read -- 2. --; line 25, "4." should read -- 3. --; line 58, "5." should read -- 4. --. Column 19, line 3, "6." should read -- 5. --; line 46, "7." should read -- 6. --. Column 20, line 18, "8." should read -- 7. --. Column 21, line 19, "9." should read -- 8. --. Column 22, line 5, "10." should read -- 9. --. Column 23, line 8, "11." should read -- 10. --; line 59, "12." should read -- 11. --. Column 24, line 32, "13." should read -- 12. --; line 44, "characters" should read -- character --. In the heading to the printed specification, line 8, "13 Claims." should read -- 12 Claims. --.

Signed and sealed this 12th day of August 1969.

(SEAL)
Attest:

EDWARD M.FLETCHER,JR.
Attesting Officer

WILLIAM E. SCHUYLER, JR.
Commissioner of Patents